US010558793B2

(12) United States Patent
Todasco et al.

(10) Patent No.: US 10,558,793 B2
(45) Date of Patent: *Feb. 11, 2020

(54) AUTHENTICATION BASED ON OBJECT RECOGNITION

(71) Applicant: PayPal, Inc., San Jose, CA (US)

(72) Inventors: Michael Charles Todasco, Santa Clara, CA (US); Sumeet Ahuja, Milpitas, CA (US); Prashanthi Ravanavarapu, Milpitas, CA (US); Geetha Kuppuswamy, San Jose, CA (US); Dushyanth Bharadwaj, Scotts Valley, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,778

(22) Filed: Jul. 17, 2018

(65) Prior Publication Data

US 2019/0018950 A1 Jan. 17, 2019

Related U.S. Application Data

(63) Continuation of application No. 15/081,774, filed on Mar. 25, 2016, now Pat. No. 10,025,919.

(51) Int. Cl.
*H04L 29/00* (2006.01)
*G06F 21/36* (2013.01)
(Continued)

(52) U.S. Cl.
CPC ............ *G06F 21/36* (2013.01); *G06F 3/0482* (2013.01); *G06F 16/29* (2019.01); *G06F 16/54* (2019.01);
(Continued)

(58) Field of Classification Search
CPC .. G06F 21/36; G06F 3/0482; G06F 17/30274; G06F 17/30241; H04L 63/102; H04L 63/083
See application file for complete search history.

(56) References Cited

U.S. PATENT DOCUMENTS 10,025,919 B2 7/2018 Todasco et al.
2003/0074130 A1* 4/2003 Negishi ............. G01C 21/3647
701/431

(Continued)

OTHER PUBLICATIONS

Dao et al., "Integration of multimedia and location-based services on mobile phone tour guide system", 2009 IEEE International Conference on Network Infrastructure and Digital Content, Date of Conference: Nov. 6-8 (Year: 2009).*

(Continued)

*Primary Examiner* — Morshed Mehedi
(74) *Attorney, Agent, or Firm* — Haynes and Boone, LLP

(57) ABSTRACT

Various systems, mediums, and methods herein describe aspects of an authentication system. The system may receive a request from a user device to authenticate a user. The system may determine a route travelled by the user. The route can be determined based at least on data retrieved from the user device of the user. The system may determine one or more objects viewable along the route. At least one image of the one or more objects can be selected. The system may communicate the at least one image and at least one other image to the user device to be displayed on the user device. The system may receive a selection of the at least one image by the user through a display of the user device. The authentication of the user can be based, at least in part, on the user selection of the at least one image.

20 Claims, 14 Drawing Sheets

(51) Int. Cl.

| | |
|---|---|
| *H04L 29/06* | (2006.01) |
| *G06F 3/0482* | (2013.01) |
| *G06F 16/29* | (2019.01) |
| *G06F 16/54* | (2019.01) |
| *G06F 21/31* | (2013.01) |
| *G06F 16/9537* | (2019.01) |
| *G06F 16/58* | (2019.01) |

(52) U.S. Cl.
CPC .......... *G06F 16/58* (2019.01); *G06F 16/9537* (2019.01); *G06F 21/316* (2013.01); *H04L 63/08* (2013.01); *H04L 63/102* (2013.01); *G06F 2221/2111* (2013.01)

(56) References Cited

U.S. PATENT DOCUMENTS

| | | | | |
|---|---|---|---|---|
| 2004/0225880 | A1* | 11/2004 | Mizrah | G06F 21/46 713/155 |
| 2007/0209065 | A1* | 9/2007 | Branam | H04L 63/0815 726/5 |
| 2008/0098464 | A1* | 4/2008 | Mizrah | G06F 21/36 726/5 |
| 2012/0314082 | A1* | 12/2012 | Bezine | G06Q 10/10 348/161 |
| 2014/0129976 | A1* | 5/2014 | Beaurepaire | G01C 21/367 715/788 |
| 2015/0347869 | A1* | 12/2015 | Leddy | G06F 21/36 382/115 |
| 2016/0065570 | A1* | 3/2016 | Spencer, III | G06Q 20/40 726/7 |
| 2016/0132673 | A1* | 5/2016 | Birk | G06F 21/36 726/19 |
| 2016/0239803 | A1* | 8/2016 | Borley | G06Q 10/0833 |

OTHER PUBLICATIONS

Rahman et al. "Seeing Beyond Visibility: A Four Way Fusion of User Authentication for Efficient Usable Security on Mobile Devices", IEEE Eighth International Conference on Software Security and Reliability-Companion, Date of Conference: Jun. 30-Jul. 2 (Year: 2014).*

* cited by examiner

402

Top 10 Best New
Musical Acts of
the Year

404

Listen to Music,
on Smart Watches

AUTHENTICATION BASED ON OBJECT RECOGNITION

CROSS REFERENCED TO RELATED APPLICATIONS

This application is a continuation of U.S. patent application Ser. No. 15/081,774, filed on Mar. 25, 2016, (now issued as U.S. Pat. No. 10,025,919 on Jul. 17, 2018), the contents of which are incorporated by reference in its entirety.

TECHNICAL FIELD

This disclosure generally describes various mechanisms to authenticate a user with a user device.

BACKGROUND

An authentication process is usually invoked when a user attempts to access a device that requires a one or more forms of user identification. For example, a username and a password may be a form of identification required to authenticate the user. Various systems may have different requirements for implementing usernames and passwords. Some authentication systems require the user to change the username or password after a certain period of time. This may require the user to remember different usernames and passwords, possibly including various changes to their usernames and passwords. Thus, such systems may require users to memorize their usernames and passwords, thereby making it difficult or cumbersome for the users to successfully authenticate an account. One reason for requiring periodic changes of authentication information is to protect the security of online or Internet-based transactions from Internet hackers and reduce the likelihood of fraudulent Internet activity.

As such, there is much need for technological advancements to support authentication systems that rely on user information and in some instances, without having to keep track of changes to usernames and passwords.

Figure 1:
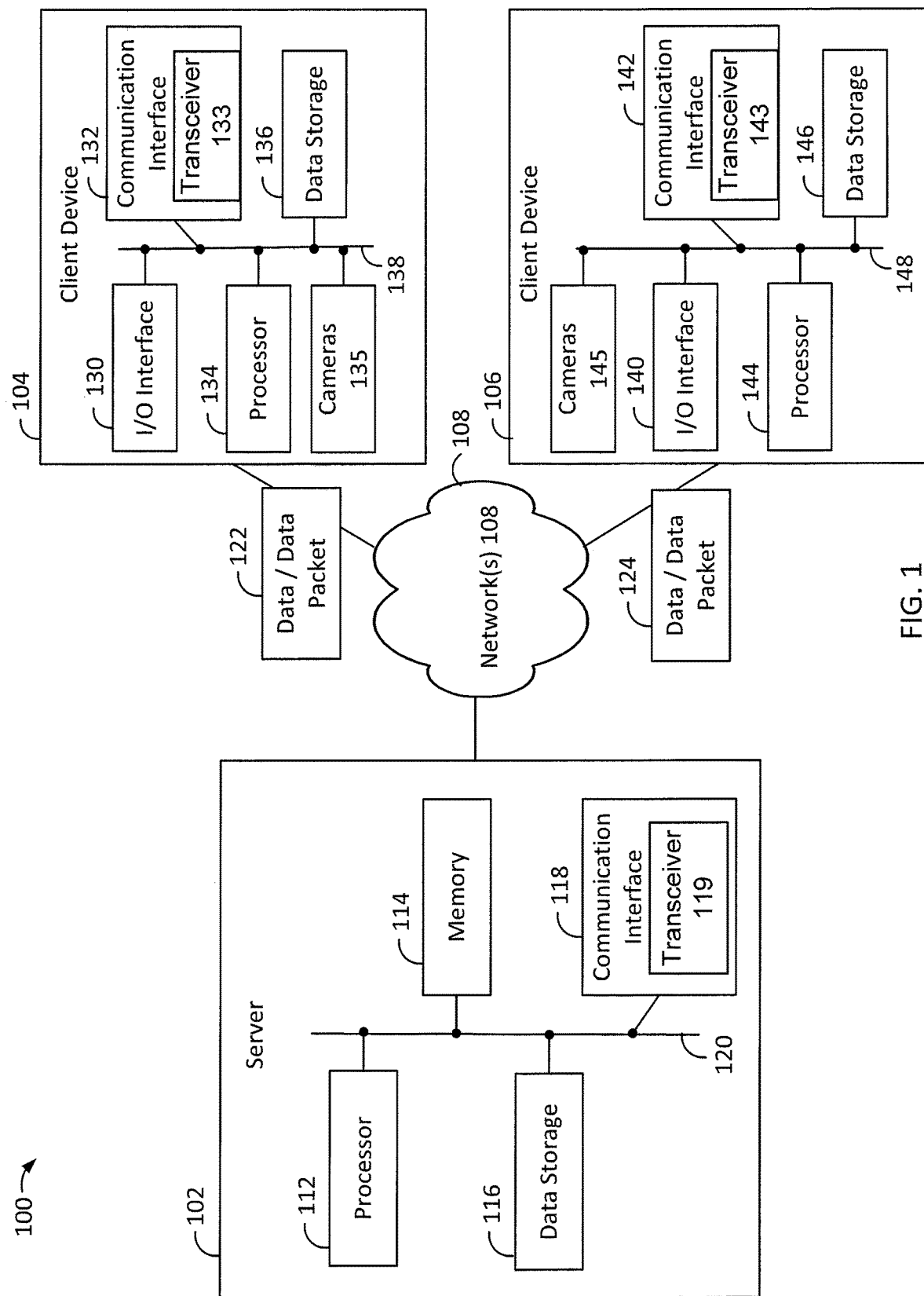
FIG. 1 is a block diagram of an exemplary authentication system, according to an embodiment.

Embodiments of the present disclosure and their advantages may be understood by referring to the detailed description provided herein. It should be appreciated that reference numerals may be used to illustrate various elements and/or features provided in the figures. Further, the figures may illustrate various examples for purposes of illustration and explanation related to the embodiments of the present disclosure and not for purposes of any limitation.

DETAILED DESCRIPTION

In some embodiments, a user of a device may be identified by an authentication system based on objects viewed by the user. As an example, consider a scenario where the user may take a given route to work, where the route includes a number of streets. In another example, the user may walk or bike to work, where the route may be a walkway or a bike path. In various such circumstances, the authentication system can determine the user's route to work and also the objects viewed or potentially viewed by the user as the user travels along the route. The objects may include one or more structures, signs, billboards, electronic displays, and landmarks, among other possible objects along the route.

The authentication system can also determine images of the objects according to the user's view as the user travels along the route. For example, the system may determine that the user is travelling by a landmark, such as a baseball stadium such that the baseball stadium is viewable by the user. In some embodiments, the system can identify an image of the baseball stadium that can be used to authenticate the user. In particular, the system can search and select a particular image of the baseball stadium that corresponds to the user's view of the baseball stadium from the route. Since the user may remember that particular view of the baseball stadium on the way to work, the image of that view may be used to authenticate the user. In some embodiments, another user may take a different route to work without viewing or seeing the baseball stadium.

For example, the system may receive a login request from the user to authenticate the user's account, possibly where the user is attempting to access an account with a user device, such as a laptop computer at the workplace or a smartphone carried by the user. In such instances, the system may use the image of the baseball stadium to authenticate the user. In particular, the system may send the image along with a number of other images to the laptop computer, prompting the user to login by selecting an image that is recognized. Since the image of the baseball stadium captures the user's view of the stadium on the way to work, the image may be familiar or recognized by the user. Further, the image may be particularly familiar to the user based on the route travelled to get to work. As such, the user may be more likely to select the image of the baseball stadium as opposed to the other images without the user having to actively designate or select the baseball stadium view beforehand as an authenticating image for the user's account.

In some embodiments, in response to the request to authenticate, the system may communicate with the user device. In some instances, the system may send one image of the viewable objects to the user device, such as the image of the baseball stadium described above. Further, the system may send one other image to the user device that depicts a landmark unfamiliar (e.g., unrecognizable) to the user. The system may also cause the user device to display the image of the viewable objects, such as the baseball stadium, and the other image of the landmark unfamiliar (e.g., unrecognizable) to the user.

In some embodiments, the system may prompt the user to select one or more images as a second factor authentication. In particular, where the user forgets a password to an account, the system may utilize the image of the ball park as a mechanism to allow the user to recover the forgotten password. Yet, the system may also periodically request the user to select an image of an object along the route to determine whether using images would be an effective form of authenticating the given user. As such, the system may develop a customized authentication mechanism based on the user, particularly with the user's ability or cognitive learning style to recognize or recollect objects viewed along a given route.

In further examples, a number of billboards or signs may be provided on a given route. For example, the system may identify an image a single billboard that is posted along the user's route to work. Further, the system may identify an image for each of multiple billboards along the user's route such that a series of images may be used to authenticate the user. For example, each of the multiple billboards may include a message. As such, the system may generate a series of such messages to authenticate the user. For example, the first billboard may be an advertisement for music and the second billboard may be an advertisement for a smart watch. As such, the user may be prompted to select messages or words such as "music" and/or "smart watch" to authenticate the user. Yet, in some instances, the user may select a combination of the words, "music" and/or "smart watch," possibly based on the series of messages viewed along the route.

In some embodiments, the image and/or message displayed on a billboard can depend on the billboard's location, where the image and/or the messages change over time. In particular, considering the scenarios above, the authentication may be based on the images and/or messages viewed by the user on the billboards along the specific route taken by the user and also during a specific period of time the user goes to work. Thus, people who travelled on the specific route in approximately the same time frame may view the same objects viewed by the user. Therefore, the user authentication based on objects viewed along the route to work specifically corresponds to the user's knowledge and minimizes the chances of random outsiders being able to select the correct images when prompted during a login. It should be noted that images and/or messages viewed by other users for purposes of authentication may be different and may depend on respective routes taken by such users, possibly also depending on the time of the day.

In some embodiment, the route may have substantially slow traffic such that the user may slow down on congested spots when driving to work, or may stop at a number of traffic lights, stop signs, road constructions, accidents, or stop lights. In an example, a congested route or a congested section of a route includes a plurality of vehicles (e.g., 3, 5, 10 or 20 vehicles) moving at a slow speed (e.g., less than 5, 10, or 20 miles per hour) and following each other. Thus, the system may determine that the user has an opportunity to view billboards or landmarks on congested routes and/or based on the user being proximate to the traffic lights, signs, or other locations where the user may be stopped. For example, the user may be stopped at a particular intersection with traffic lights, thereby giving the user an opportunity to read a billboard message. As such, the system may determine images of the billboard message. Thus, during a login, the user may be prompted with a number of images, including the billboard message at the particular intersection with the traffic lights. It is noted that stopping locations with traffic lights may include various locations where the user may be stopped and/or provided with the opportunity to view a specific object or image. For a corresponding login, the user may select the image that may correspond to the billboard message viewable from the stopping location. Further, the system may determine a different view of the billboard based on the user going to work as opposed to the user driving back from work. As such, different views of the billboard may be used to authenticate the user as well.

In some embodiments, the user may take a first route and drive a car to work, take a second route (bike path) and ride a bike to work, or take a third route (walkway) and walk to work, among other possibilities. As such, the user may view different objects when taking multiple different routes. As an example, the user may take different routes on different days of the week, possibly depending on traffic. As another example, a single route to a target location may include a number of segments. The route to work may include driving to a train station, taking the train to the destination station, and then walking or biking to work. In a further example, the route to work may include walking to a bus stop, taking a bus to a destination stop, and then walking to work. Additionally, the user may view billboards during the bus/train ride and particularly at train stations and/or bus stops. Therefore, the user views of various billboards can be based on multiple different scenarios.

In various circumstances, the example embodiments described herein may resolve various challenges with authenticating a user of a user device with access to communication networks and data infrastructures. As such, the example embodiments described herein may resolve problems that did not exist before the availability of the computer networks and/or the Internet, particularly accessing computer networks and/or the Internet to authenticate users. In particular, such embodiments may address problems specific to authenticating a user of a user device coupled to computer networks and/or the Internet, thereby improving Internet security. Various such embodiments may provide solutions that are technical in nature and/or rooted in authenticating users over computer networks and/or the Internet. Further, such embodiments may provide unconventional steps confined to one or more particular useful applications related to a given user being authenticated with a user device to get access to a computer network and/or the Internet.

FIG. 1 is a block diagram of an exemplary system 100, according to an embodiment. The system 100, possibly referred to as the authentication system 100, may be configured to transfer data over one or more communication networks 108. In particular, the system 100 may include the server 102, possibly referred to as the server system 102. The server 102 may be configured to perform operations of a service provider, such as PayPal, Inc. of San Jose, Calif., USA. Further, the system 100 may also include user device 104 and/or the user device 106 operated by their respective users. In practice, the server 102 and the user devices 104 and/or 106 may be configured to communicate over the one or more communication networks 108.

In an embodiment, the authentication system 100 may include the server 102. The server 102 can include the non-transitory memory 114. The server 102 of the authentication system 100 can have one or more hardware processors 112 coupled to the non-transitory memory 114 and configured to read the instructions from the non-transitory memory 114 to cause the authentication system 100 to perform the operations.

The system 100 may operate with more or less than the computing devices shown in FIG. 1, where each device may be configured to communicate over one or more communication networks 108, possibly to transfer data accordingly. The one or more communication networks 108 may also include a packet-switched network configured to provide digital networking communications, possibly to exchange data of various forms, content, type, and/or structure. The one or more communication networks 108 may include a data network such as a private network, a local area network, and/or a wide area network. In some instances, the one or more communication networks 108 may include a communications network such as a telecommunications network and/or a cellular network with one or more base stations, among other possible networks.

The data/data packets 122 and/or 124 may be transferrable using communication protocols such as packet layer protocols, packet ensemble protocols, and/or network layer protocols. For example, the data/data packets 122 and/or 124 may be transferrable using transmission control protocols and/or internet protocols (TCP/IP). In various embodiments, each of the data/data packets 122 and 124 may be assembled or disassembled into larger or smaller packets of varying sizes. As such, data/data packets 122 and/or 124 may be transferrable over the one or more networks 108 and to various locations in the authentication system 100.

In some embodiments, the server 102 may take a variety of forms. The server 102 may be an enterprise server, possibly configured with one or more operating systems to facilitate the scalability of the system 100. For example, the server 102 may configured with a Unix-based operating system to integrate with a growing number of other servers, user devices 104 and/or 106, and one or more networks 108 over the system 100.

In some embodiments, the server 102 may include multiple components, such as a hardware processor 112, a non-transitory memory 114, a non-transitory data storage 116, and/or a communication interface component 118, among other possible components, any of which may be communicatively linked via a system bus, network, or other connection mechanism 120. The hardware processor 112 may take the form of a multi-purpose processor, a microprocessor, a special purpose processor, a digital signal processor (DSP) and/or other types of processing components. For example, the processor 112 may include an application specific integrated circuit (ASIC), a programmable system-on-chip (SOC), and/or a field-programmable gate array (FPGA) to process, read, and/or write data for authentication process of numerous users. In particular, the processor 112 may include a variable-bit (e.g., 64-bit) processor architecture specifically configured to facilitate the scalability of the increasing number of authentications. As such, the one or more processors 112 may execute varying instructions sets (e.g., simplified and complex instructions sets) with fewer cycles per instruction than other conventional general-purpose processors to improve the performance of the server 102 for purposes of mass scalability and/or accommodation of growth.

The non-transitory memory component 114 and/or the data storage 116 may include one or more volatile, non-volatile, and/or replaceable data storage components, such as a magnetic, optical, and/or flash storage that may be integrated in whole or in part with the hardware processor 112. Further, the memory component 114 may include a number of instructions and/or instruction sets. The processing component 112 may be coupled to the memory component 114 and configured to read the instructions to cause the server 102 to perform operations, such as those described in this disclosure, illustrated by the accompanying figures, and/or otherwise contemplated herein. Notably, the data storage 116 or memory 114 may be configured to store numerous user data, possibly including data that may be accessed often by the user devices 104 and/or 106. For example, the user data may include user ID and data of the routes taken by a user and the objects along the routes.

The communication interface component 118 may take a variety of forms and may be configured to allow the server 102 to communicate with one or more devices, such as the user devices 104 and/or 106. For example, the communication interface component 118 may include a transceiver 119 that enables the server 102 to communicate with the user devices 104 and/or 106 via the one or more communication networks 108. Further, the communication interface component 118 may include a wired interface, such as an Ethernet interface, to communicate with the user devices 104 and/or 106. Yet further, the communication interface component 118 may include a wireless interface, such as a cellular interface, a Global System for Mobile Communications (GSM) interface, a Code Division Multiple Access (CDMA) interface, and/or a Time Division Multiple Access (TDMA) interface, among other possibilities. In addition, the communication interface 118 may include a wireless local area network interface such as a WI-FI interface configured to communicate with a number of different protocols. As such, the communication interface 118 may include a wireless interface configured to transfer data over short distances utilizing short-wavelength radio waves in approximately the 2.4 to 2.485 GHz range. In some instances, the communication interface 118 may send/receive data or data packets 122 and/or 124 to/from user devices 104 and/or 106.

The user devices 104 and 106 may also be configured to perform a variety of operations such as those described in this disclosure, illustrated by the accompanying figures, and/or otherwise contemplated herein. Notably, the data storage 136/146 of the user devices 104 and 106 may be configured to store numerous user data, possibly including data that may be accessed often by the user devices 104 and 106 such as geographic data, movement data, location data, among other types of data associated with routes taken by the user and the objects along the routes. For example, the user devices 104 and 106 may be configured to authenticate a user of the user devices 104 and 106 based on data stored in the user devices. Alternatively, the user devices 104 and 106 may be configured to authenticate respective users of the user devices 104 and 106 based on data retrieved from the server 102.

In some embodiments, the user devices 104 and 106 may include or take the form of a user device system, a personal computer (PC) such as a laptop device, a tablet computer device, a wearable computer device, a head-mountable display (HMD) device, a smart watch device, and/or other types of computing devices configured to transfer data. The user devices 104 and 106 may include various components, including, for example, input/output (I/O) interfaces 130 and 140, one or more cameras 135/145, communication interfaces 132 and 142 that may include transceivers 133 and 143, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to respective users of the user devices 104 and 106. For example, the I/O interface 130 may include a display that provides a graphical user interface (GUI) configured to receive an input from a user, for example to authenticate the user. Thus, the I/O interfaces 130 and 140 may include displays configured to receive inputs and/or other input hardware with tangible surfaces, such as touchscreens with touch sensitive sensors and/or proximity sensors. The I/O interfaces 130 and 140 may also include a microphone configured to receive voice commands, a computer mouse, a keyboard, and/or other hardware to facilitate input mechanisms, possibly to authenticate a user. In addition, I/O interfaces 130 and 140 may include output hardware such as one or more sound speakers, other audio output mechanisms, haptic feedback systems, and/or other hardware components.

In some embodiments, communication interfaces 132 and 142 may include or take a variety of forms. For example, communication interfaces 132 and 142 may be configured to allow user devices 104 and 106, respectively, to communicate with one or more devices according to a number of protocols described and/or contemplated herein. For instance, communication interfaces 132 and 142 may be configured to allow user devices 104 and 106, respectively, to communicate with the server 102 via the one or more communication networks 108. The hardware processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components.

The non-transitory data storages 136 and 146 may include one or more volatile or non-volatile data storages, removable or non-removable data storages, and/or a combination of such data storages that may be integrated in whole or in part with the hardware processors 134 and 144, respectively. Further, data storages 136 and 146 may include non-transitory memories that store instructions and/or instructions sets. Yet further, the processors 134 and 144 may be coupled to the data storages 136 and 146, respectively, and configured to read the instructions from the non-transitory memories to cause the user devices 104 and 106 to perform operations, respectively, such as those described in this disclosure, illustrated by the accompanying figures, and/or otherwise contemplated herein.

Figure 2A:
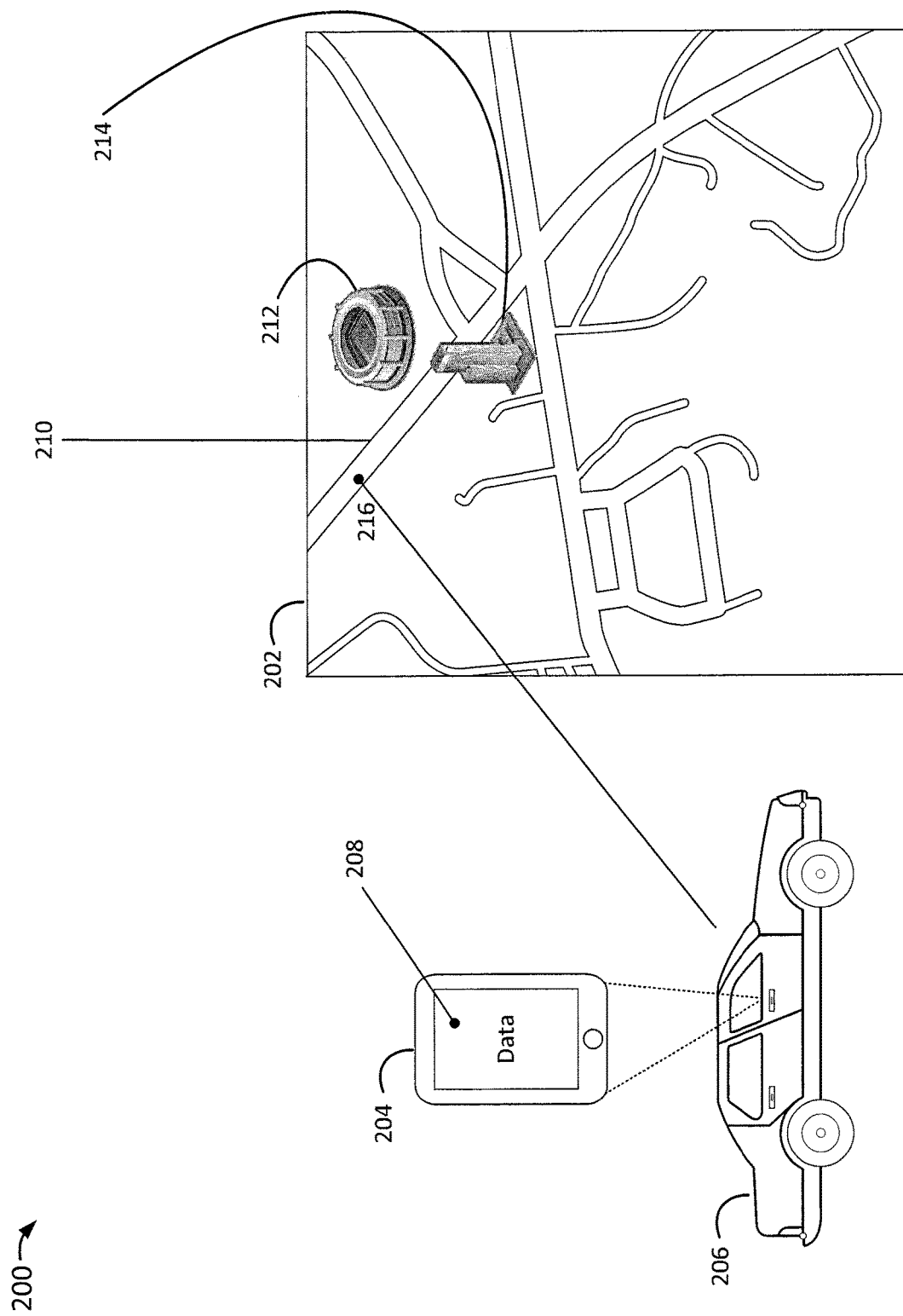
FIG. 2A is a diagram of an exemplary authentication system including the routes and objects, according to an embodiment.

FIG. 2A is an exemplary authentication system including the routes and objects, according to an embodiment. As shown, the user device 204 may take the form of a mobile device and/or smart phone such as the user device 104 described above in relation to FIG. 1. In some embodiments, the user device 204 may take the form of the user devices 104 or 106 described above with respect to FIG. 1. For example, the user device 204 may take the form of user device 104. As such, the user device 204 may display the data 208 and the map 202 on an I/O interface that takes the form of the I/O interface 130 of user device 104. In another example, the I/O interface (e.g., a graphical user interface) of the user device 204 may display one or more images of the objects, such as the image of the baseball stadium 212.

The authentication system 200 shows an example map 202. Among other things, the map 202 includes the object 212 (e.g., a baseball stadium), the object 214 (e.g., a work place), and the route 210. The authentication system 200 also shows a vehicle 206 of the user, where the user has a user device 204. In an example, the user may travel on the route 210 in the vehicle 206 to go to work 214. As shown, the user device 204 may be at a location 216 along the route 210 where the user may view the baseball stadium 212. In an example, data 208 can be displayed on the display screen of the user device 204. The displayed data can be the map 202, possibly including one or more images. As one example, a portion or the whole map 202 including the route 210 can be displayed on the display screen of the user device 204.

In some embodiments, the route 210 associated with the user can be determined by the authentication system 200. The route 210 can be determined based on the data 208 retrieved from the user device 204. In an example, the route 210 can be determined via a mapping module (e.g., a hardware and/or software module) associated with the user device 204. The mapping module may determine the route 120 based on the user driving the vehicle 206 along the route 210. In another example, the mapping module of the user device 204 can use global positioning system (GPS) signals to determine the location 216 of the vehicle 206 along the route 210. In some instances, the data 208 may include location data or GPS data, possibly stored in a memory (data storage) of the user device 204 that may take the form of the components 136 and 146 of the user devices 104 and 106, respectively, as described above. Additionally, the location data may be retrieved, consolidated into data packets, and sent by the user device 204 through a wireless network, e.g., network 108 of FIG. 1, to the server 102 of the authentication system 100 to be stored in the data storage 116 or memory 114 of the server 102.

In some embodiments, one or more objects 212, shown in authentication system 200, associated with the route 210 can be determined or detected. As an example, the object 212 can be a landmark such as the baseball stadium viewable by the user of the vehicle 206, potentially operating the vehicle 206 or possibly as a passenger of the vehicle 206. Additionally, an image of the baseball stadium 212 can be determined. In an example, the image of the baseball stadium 212 can be determined according to the user view of the baseball stadium 212. For instance, the image may be determined from the angle, azimuth, and/or altitude at which the user is viewing the baseball stadium 212 at the location 216 of the route 210. Further, the image may be determined based on the movement, acceleration, velocity, and/or angular velocity of the vehicle 206.

In an example, the image may be determined (e.g., selected) by the server 102 of the authentication system 100/200 to authenticate the user. In particular, the server 102 may determine the location 216 of the user device and retrieve images of the baseball stadium 212. The image may be retrieved from the network 108 and transferred to the user device 204 to authenticating the user based on the user selecting the image from one or more other images provided. Further, the image can be determined by the user device 204 such that the user device 204 may determine the location 216 of the user device 204 and retrieve the image of the baseball stadium 212. It should also be noted that the server 102 may determine the image of the baseball stadium 212 from images available over the Internet that may or may not correspond with the user's view from the route 210.

Figure 2B:
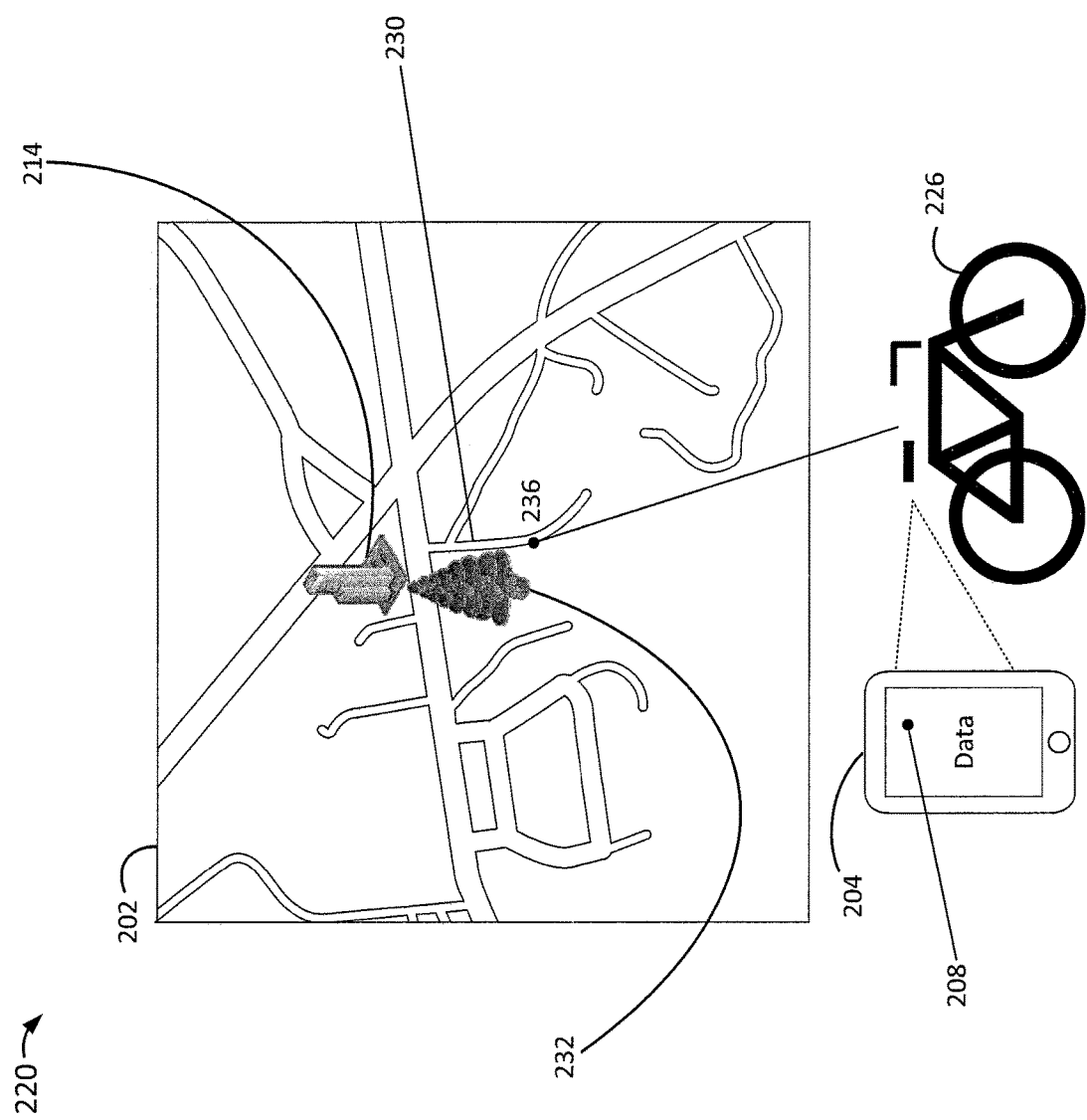
FIG. 2B is a diagram of an exemplary authentication system including the routes and objects, according to an embodiment.

FIG. 2B is an exemplary authentication system including the routes and objects, according to an embodiment. The authentication system 220 may take the form of authentication system 200. The authentication system 220 shows the example map 202. Among other things, the map 202 includes the object 232 (e.g., a tree), the object 214 (e.g., the user's work place), and the route 230. FIG. 2B also shows a bicycle 226 of the user, possibly where the user carries the user device 204. In an example, the user may travel along the route 230 riding the bicycle 226 to go to work 214. As shown, the user device 204 is at a location 236 on the route 230 where the user may view the tree 232. In an example, the route 230 associated with the user can be determined by the authentication system 220. The route 230 can be determined based on the data 208 retrieved from the user device 204 associated with the user. The data may include GPS data that corresponds to the user travelling along the route 230.

Additionally, an image of the object 232, e.g., an image of the tree can be determined to authenticate the user. In an example, the image of the object 232 can be determined according to the user view of the tree 232, possibly from the route 230 as the user is riding the bicycle 226. For instance, the image may be determined from the angle, azimuth, and/or the altitude of the user viewing the tree 232 at location 236 along the route 230. Further, the image may be determined based on the movement, acceleration, velocity, and/or the angular velocity of the bicycle 226. Yet, as noted, the image of the object 232 may be determined from one or more networks, such as the one or more networks 108. In particular, the server 102 may search and identify one or more images of the object 232 from various networks 108 accessible by the server 102. As such, the image may be provided to the user such that the image may be selected to authenticate the user.

Figure 2C:
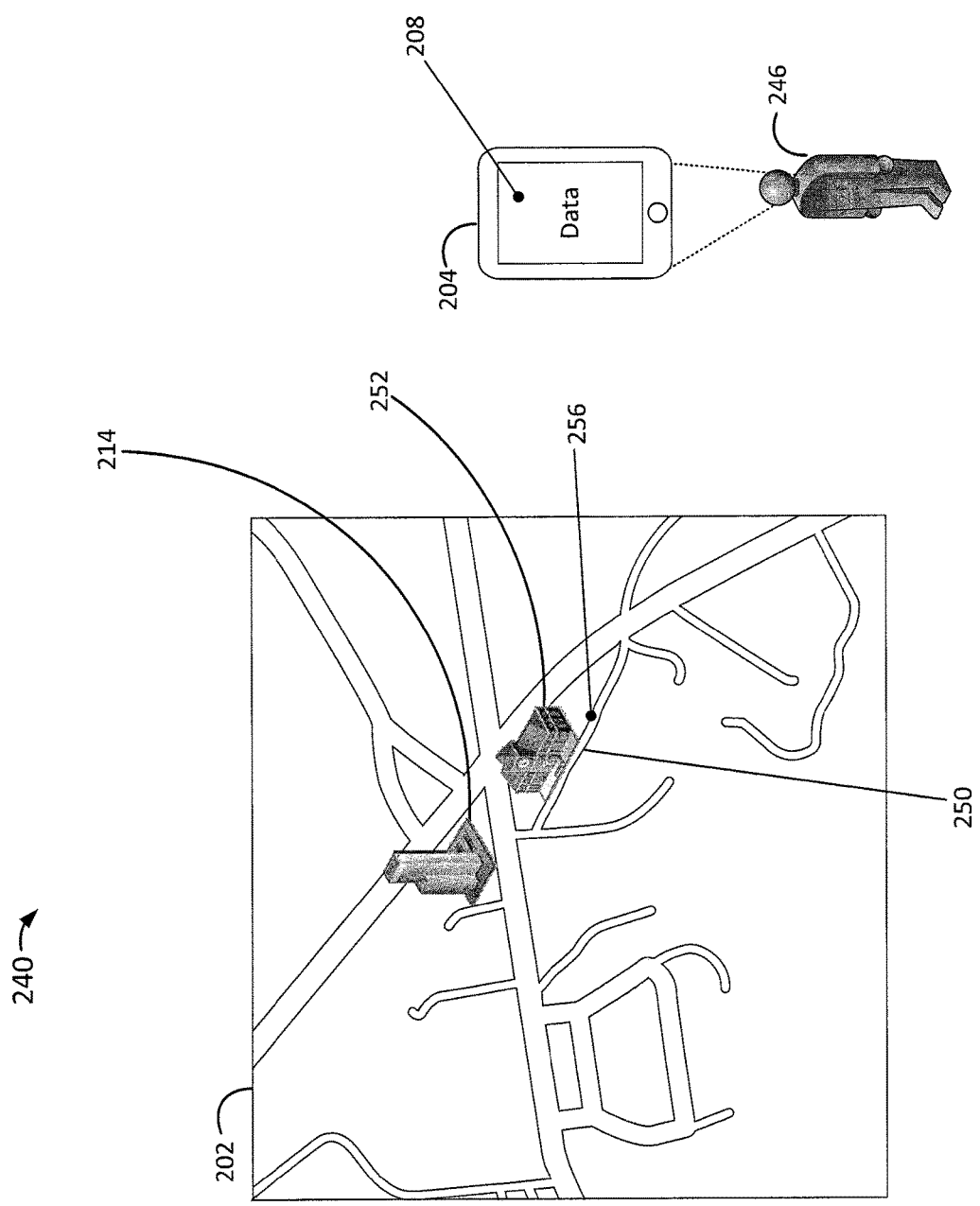
FIG. 2C is a diagram of an exemplary authentication system including the routes and objects, according to an embodiment.

FIG. 2C is an exemplary authentication system including the routes and objects, according to an embodiment. The authentication system 240 may take the form of authentication system 220. The authentication system 240 shows the example map 202. Among other things, the map 202 includes the object or structure 252 (e.g., town hall), the object or structure 214 (e.g., the work place), and the route 250, possibly a side walk or a walking path. The authentication system 240 also shows the user 246 with the user device 204. In an example, the user 246 may walk along the route 250 to go to work 214. As shown, the user device 204 is at a location 256 on the route 250, where the user may view the town hall 252. In an example, the route 250 associated with the user 246 can be determined by the authentication system 240. The route 250 can be determined based on data 208 retrieved from the user device 204 associated with the user. The data 208 may indicate that the user walking along the route 250.

Additionally, the system 240 may determine one or more objects 252 associated with the route 250. The system may also determine an image of the town hall 252. In an example, the image of the town hall 252 can be determined according to the user view of the town hall 252 based on the user walking on the route 250. For instance, the image may be determined from the angle, azimuth, and/or altitude of the user 246 viewing the town hall 252 at location 256 along the route 250. Yet, as noted, the image of the object 252 may be determined from one or more networks, such as the one or more networks 108. In particular, the server 102 may search and identify one or more images of the object 252 from various networks 108 accessible by the server 102, such as the Internet. As discussed, the routes 210, 230, and 250 can include any one of a street, a bike path, and/or a walkway, among other possible avenues of travel. Additionally, the image determined can correspond to the user view from any one of the street, the bike path, and/or the walkway, among the other possibilities.

In some embodiments, one or more objects 212, 232, and 252 associated with the routes 210, 230, and/or 250, respectively, can include a billboard, a number of posters, an electronic display, and/or a combination of light emitting diodes (LEDs), among various other visible objects. As such, the system 240 may determine an image of such objects from a respective route 210, 230, and/or 250. In some instances, the system 240 may determine the images based on time, such as every hour, every day, or every week. Additionally, the system 240 may determine a message or a string of messages from various objects, such as billboards. Thus, the user's view of the billboard images at a given time or messages conveyed can be used to authenticate the user.

For example, the user may view an image of a penguin on a billboard located along the route 210 in FIG. 2A. For authentication, the user may be provided with the same or a similar penguin image on a display screen of user device 204, possibly that takes the form of the I/O interface 130. The user may be provided with the penguin image along with other random images and the user may be asked to select an image viewed along the route. Note that the "random" images are selected to ensure the images are not what the user may see along a traveled route, and in one embodiment, are also images that are determined to be unfamiliar (e.g., unrecognizable) to the user. As such, the other images are not necessarily random. As such, the user may be authenticated based on selecting the penguin image from the other random images. In some embodiments, the user route 210 may be determined via the data 208 retrieved from a user device 204 but the authentication can be performed on other user devices (e.g., the user device 106) of the user.

Figure 3A:
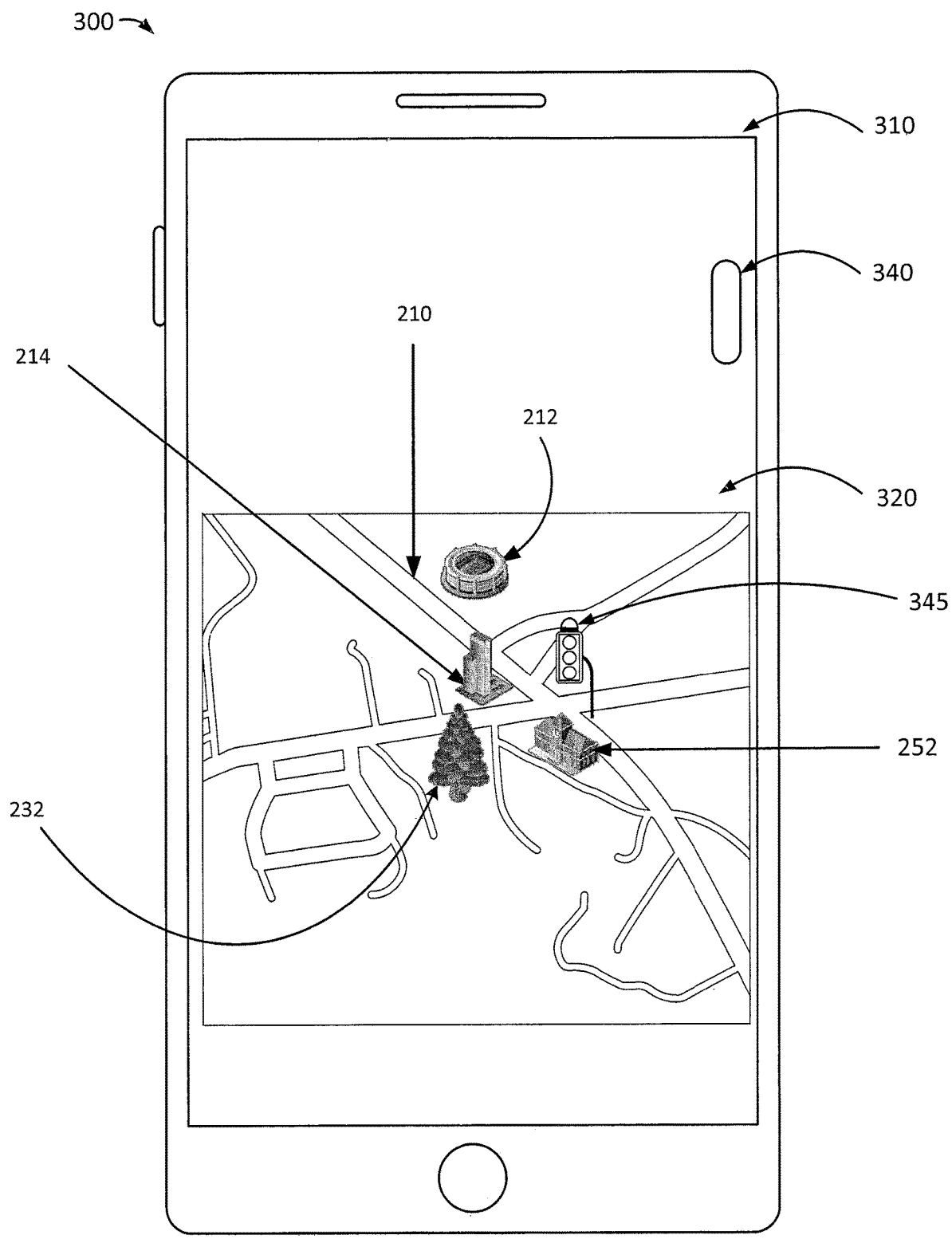
FIG. 3A illustrates a display screen of an example user device, according to an embodiment.

FIG. 3A illustrates a display screen of an example user device 300. As shown in FIG. 3A, the display screen 310 can display the map 320 that includes a number of routes and objects. As provided, the map 320 may take the form of the map 202 described above. Additionally, the scroll bar 340 may be used to view other portions of the map 320 and additional maps on the display screen 310. As an example, the mobile device 300 may take the form of the user device 104 described above in relation to the authentication systems 100, 200, 220, and/or 240.

In some embodiments, objects 212, 214, 252, and/or 345 rendered on the display screen 310 may be used to authenticate the user. For example, the user may recognize screen views of the display screen 310 to authenticate the user. As such, in some instances, the screen view of the display screen 310 may be saved and/or stored by the user device 300. Thus, during a user login, the user device 300 may request the user to select the screen view of the display screen 310 from various other screen views. By selecting the screen view of the display screen 310, the user may be authenticated. As shown, the map 320 include a congested route 210 and a traffic light (e.g., a stop light) 345. The system 300 may determine the screen view of the display screen 310 based on the objects 212, 214, 252, and/or 345 viewed by the user. Further, the system 300 may determine the screen view based on the user being stopped at the traffic light 345. As such, various such screen views of the display screen 310 may be used to authenticate the user as described below.

In some instances, the images viewed by the user can include the images of the objects viewed based on the user's vehicle slowing down on the congested route 210. For example, the user's vehicle may slow down on the congested route 210, or may stop at the traffic lights 345 on the way to work 214. Thus, the user may get a better chance of viewing the town hall 252 at the traffic light 345, or get a better chance of viewing the baseball stadium 212 in the congested route 210.

Figure 3B:
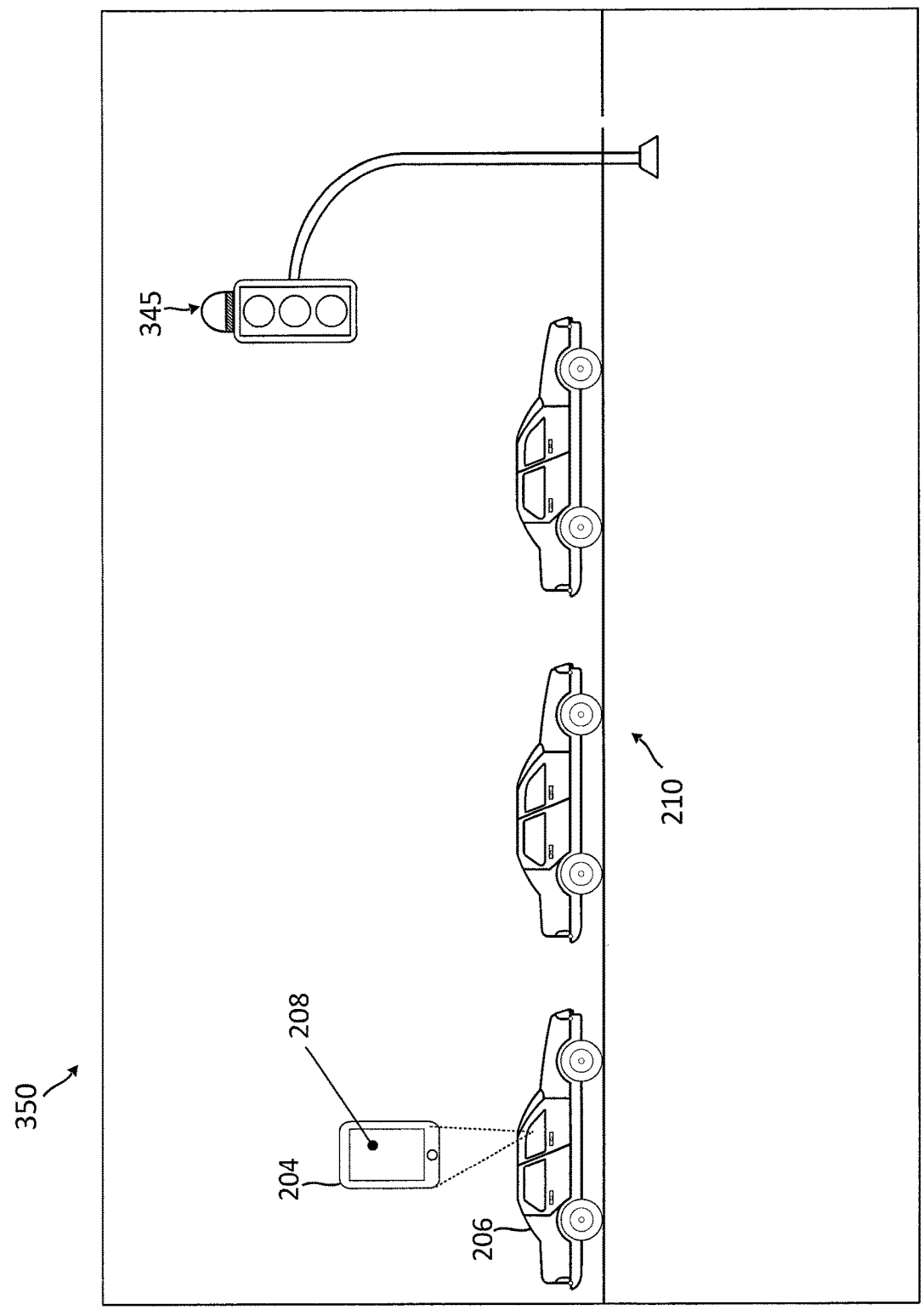
FIG. 3B illustrates an exemplary route with vehicles stopped at the traffic light, according to an embodiment.

FIG. 3B illustrates an exemplary route with vehicles stopped at the traffic light, according to an embodiment. For example, diagram 350 shows the vehicle 206 of the user at the traffic light 345 of the route 210, where the user has the user device 204. As shown, the traffic light 345 can be one of the objects viewed by the user and thus, an image viewed by the user can be associated with the user's view of the traffic light 345. As such, the image of the traffic light 345 may be used to authenticate the user in various such ways described above.

In some embodiments, the authentication systems 200, 220, and 240 may generate images for authenticating the user. In some instances, the images may be generated for a user and shown to the user along the route 210. In some instances, images can be flashed to the user from traffic light 345 when the user is at the traffic light 345. In particular, the images may be flashed to the user, possibly when the user is likely to view the traffic light 345, such as when the light turns green. For example, the system may flash the image of the penguin described above through the green light of the traffic light 345.

In some embodiment, the user may get a better opportunity or a chance of viewing billboards at the traffic light 345 or in transit with the congested routes 210. For example, the user may get a better chance of reading billboard messages at the traffic light 345 or in transit with the congested routes 210. As such, during a login, one or more images may be presented to the user, thereby prompting the user to select an image that corresponds to the user view of the objects while the user is at the traffic light 345. For example, the user view of a landmark 212 (e.g., baseball stadium) may be identified based on the user being at the traffic light 345 proximate to the landmark 212 (e.g., baseball stadium). Further, the system may determine multiple views from when the user takes the route 210 to work 214 in comparison to when the user drives back from work 214 to another location, such as the user's home.

Figure 4A:
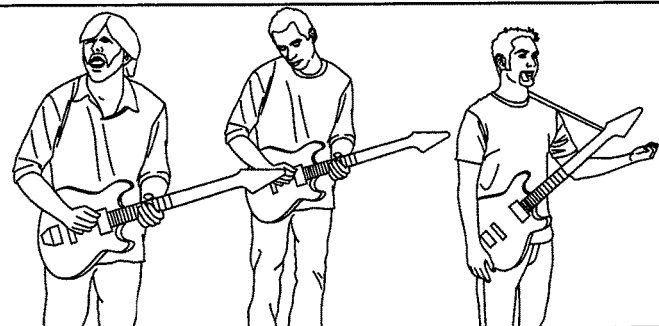
FIGS. 4A and 4B illustrate exemplary billboard objects, according to an embodiment.
Figure 4B:
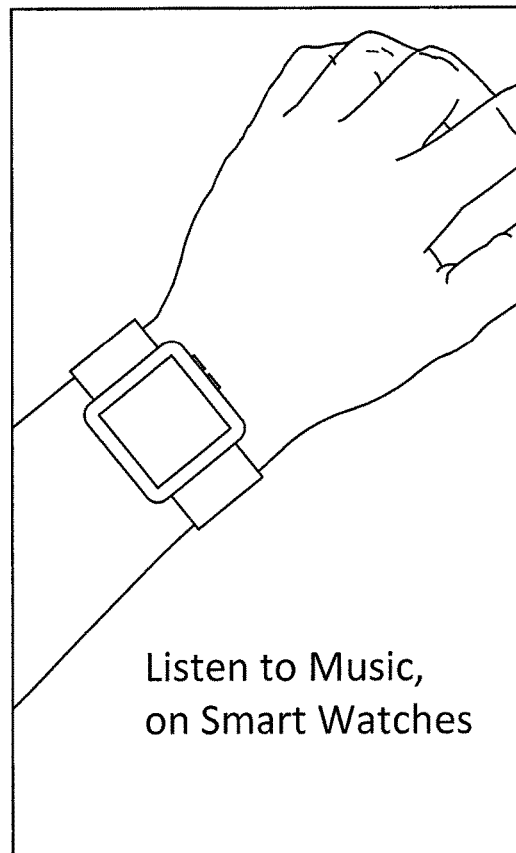

FIGS. 4A and 4B illustrate exemplary billboard objects, according to an embodiment. In some embodiments, images of billboard objects may be used to authenticate a user. As an example, the user may be travelling along a route driving a vehicle, riding on a bike, or walking, as described above. The user may view one or more of the billboards 402 and/or 404 along the route. In an example, the billboards can display static images, flashing images, and/or can flashing messages, among various combinations of such images and messages. For example, the billboard 402 may convey a message associated with "music," "musical acts," "best new musical acts," and/or the "top 10 best new musical acts." The billboard 404 may provide a message associated with "music" and/or "smart watches."

In some embodiments, the authentication system 100, 200, 220, or 240 can determine a first image and a second image of one or more objects. For example, the system may determine a first image of the billboard 402 and also a second image of the billboard 404, possibly that correspond to the user's view from a route. The first image may include a first message from the billboard 402, such as "music" or "musical acts." Further, the second image may include a second message from the billboard 404, such as "music" and/or "smart watches." The authentication system can determine a series or a combination of the first message and the second message. As such, the user may be authenticated in a login by selecting words, such as "music," "musical acts," and/or "smart watches," among various other words provided to the user. In some instances, the system may provide the word "music" and the user may select "musical acts" and/or "smart watches" to be authenticated.

Yet further, in some other embodiments, the first image and the second image, discussed above, can be the images of a single billboard, such that the single billboard can flash a series of images and the first image and the second image can be the user's view of the single billboard when the user has slowed down or stopped at the billboard. As described, the user may be authenticated based on the first image, the second image or a combination of the first image and the second image. In particular, a series of images may be selected and shown to the user, along with "random" images, where the user may be asked (e.g., prompted) to identify a plurality of images, either in any order or sequentially in an order the user may have seen the images on a selected route. In an example, no "random" images may be shown along with the series of images. By authenticating with a plurality of images, the likelihood of false authentications is reduced, especially if the images are along different streets, roads, or freeways requiring a plurality of turns or changes of direction by the user. In another embodiment, the system may select images that the user is more likely to view and/or remember, such as based on known user interests, recent purchases, recent searches (e.g., if the user has been searching for watches and a billboard has an image of a watch, the watch image may be selected over other images along the route), upcoming events the user may attend, etc.).

In another example, the billboards may flash images that are customized for the user when the user has slowed down or stopped at the billboards. In an example, a tracking module (e.g., GPS module) of the user device 300 can monitor user movements and can detect where the user stopped or slowed down on a congested route 210 or at a traffic light 345. The tracking module can further detect or associate the objects 212, 214, 232, 252, and/or 345 along the user's route 210 with the locations where the user slowed down or stopped.

Figure 5:
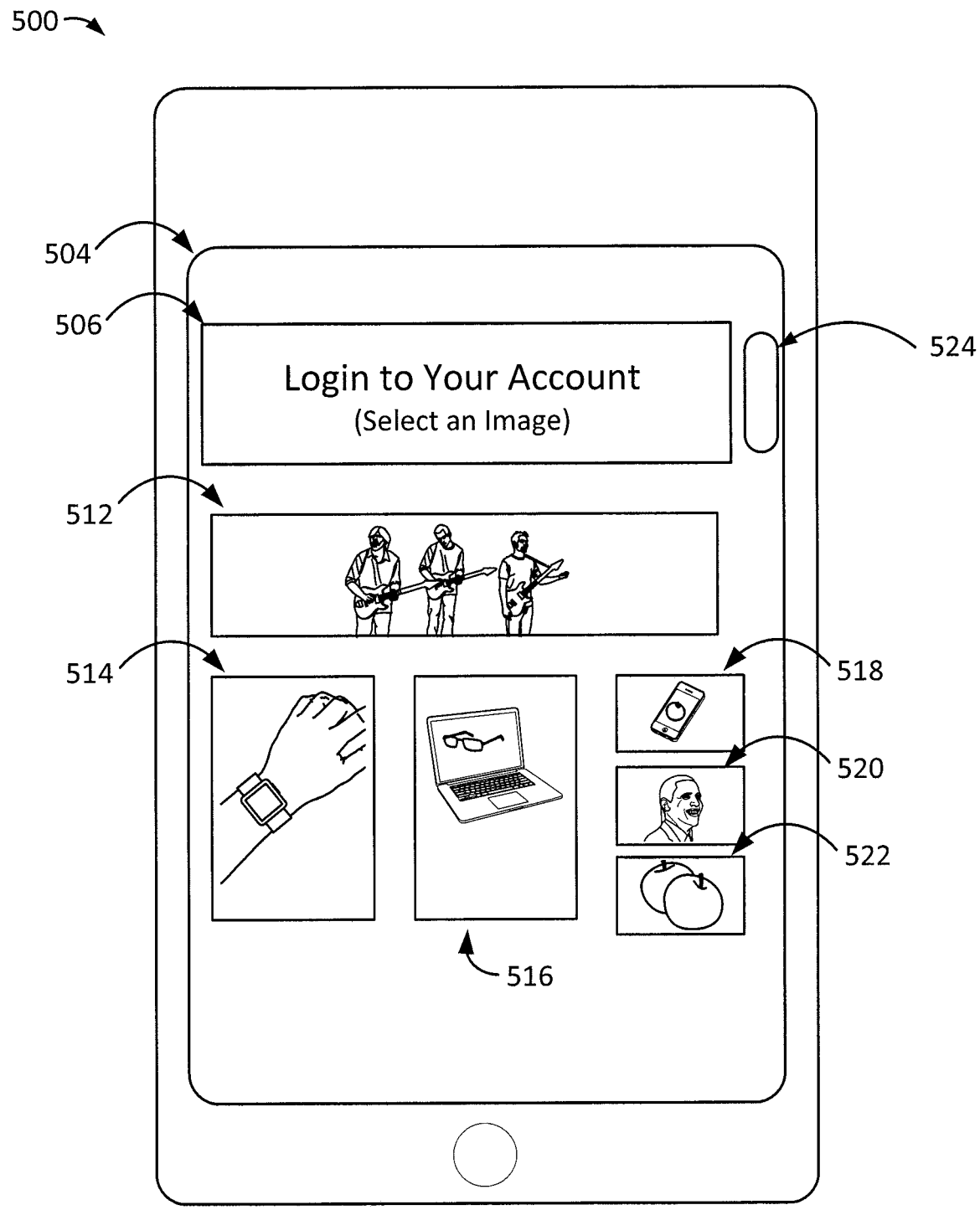
FIG. 5 illustrates a display screen of an example user device for user authentication, according to an embodiment.

FIG. 5 illustrates a display screen of an example user device 500 requesting user authentication. As an example, the mobile device 500 may take the form of the user device 104 described above and may be included in the authentication systems 100, 200, 220, or 240. The display screen 504 of the user device 500 can show a login request 506 asking the user to select one of the images on the display screen. For example, the message can ask the user to select one of the images 512, 514, 516, 518, 520, or 522 as the image viewed by the user today. As an example, the user may select on the display screen 504, one of the images 512 or 514 that are the images of or displayed on the billboard 402 or 404 viewed by the user. As such, the user device 500 may identify the user and may grant the user's login or authentication request 506. For example, based on the user authentication, the user device 500 may grant the user to access a user's account. Additionally, the scroll bar 524 may be used to view more images on the display screen 504.

In some embodiments, the request for user authentication can comprise a second factor authentication of the user that can be based at least on the user selection of the image on the display screen 504 of the user device 500. In some other embodiments, the request for user authentication can comprise a password recovery request such that the one or more user selections on the display screen 504 of the user device 500 can authenticate the password recovery request.

In some embodiments, the login request 506 can originate from the user and can be determined (e.g., received) by the user device 500. The authentication can be at least in part based on image(s) of the objects viewed on the route taken by the user. For example, the authentication can be based on route 210 travelled by the user driving the vehicle 206. The authentication can be based on the route 230 travelled by the user riding the bike 226, or the route 250 walked by the user. Additionally, authentication can be based on the object, billboards or landmarks, viewed by the user along the routes 210, 230, or 250.

In some embodiments, the login request 506 on the user screen of the user device 500 can ask the user to select an image viewed en-route to work today. The user can be identified based on the user's selection. As described above, the authentication system can determine the route associated with the user and also can determine the objects associated with the route travelled by the user. Thus, if the user selects the correct image of the object viewed today, then the user device 500 can verify the user. As an example, the identification based on a selection of a viewed image, can be part of an authentication process that may include other steps.

As an example, the login request 506 on the user screen of the user device 500 can ask the user to identify the message conveyed on the billboards 402 and 404 viewed en-route to work today, such as the billboards described above. In particular, each billboard 402 and 404 may convey a different message such that the viewed billboards convey a sequence of messages and the login request 506 may ask the user a question corresponding to the sequence of messages. As described above, a given sequence may include the words "music" and "wearable devices" associated with the billboards 402 and 404. As such, the words "music" and "wearable devices" may be selected by the user to authenticate the user's account.

In some embodiments, the authentication system can determine whether a user views an object. For example, the system may receive an indication from the user device 104 that the user views the object. In particular, the indication may be generated based on the display screen 504 that detects the user viewing at least one of the objects from the route. For example, the user device 500 may determine or detect information associated with the user's eyes. Further, the information may be determined as the user travels along the routes 210, 230, or 250 via a recognition module of the user device 500. The recognition module may be associated with cameras of the user device 500, such as the cameras 135/145 (e.g., a back-facing camera) of the user devices 104 and 106, respectively, that can detect a viewing direction of the user. For example, the user device 104 can detect the objects viewed by the user. In an example, the object can be the user device 104 of the user and the image can be a user view of the user device 104, e.g., the user view of the user device's display screen, e.g., a screen shot or screen capture of the display screen.

In some embodiments, the indication that the user views the one or more objects (e.g., the baseball stadium 212) from the route (e.g., the route 210) is determined based at least on a back-facing camera of the user device that can take the form of the cameras 135/145 of the user devices 104 and 106 and can captures user views of the one or more objects.

In some embodiments, the authentication system, e.g., the authentication system 100, 200, 220, or 240 can receive a request for authentication through a user device, e.g., the user device 104, 106, 204, 300, or 500 of the user. The request can come from the display screen, e.g., display screen 504 of the user device 500. In some embodiments, in response to the authentication request, the authentication system, e.g., the authentication system 100, 200, 220, or 240 may communicate and send at least one image of the viewable objects along the route and at least one other image to the user device, e.g., the user device 104, 106, 204, 300, or 500 of the user. The authentication system may also cause the user device to display the image of the viewable objects and the other image on the display screen e.g., display screen 504 of the user device 500 such that a user of the user device 500 can select one or more of the images.

In some embodiments, the authentication request can be received by the graphical display screen 504 of the user device 500. In some instances, in response to receiving the touch input request, the user data is stored in the data storage of user device 500 that takes the form of the data storage 136 of the user device 100. The corresponding images can be displayed by the graphical display screen 504. In some embodiments, the images can be retrieved from the server 102 of the authentication system 100.

In some embodiments, the user device 500 may also include a non-transitory machine-readable medium that takes the form of non-transitory data storage 136. In some instances, the non-transitory machine-readable medium may have stored the machine-readable executable instructions. The machine-readable executable instructions can cause a machine, such as the user device 500 to perform operations. In some instances, the operations include determining user data associated with a user, such as the data 208 described above. For example, the user device 500 may identify the user data including the routes, objects, and images of the objects associated with the user stored in the data storage 136 of the user device 500.

In some embodiments, each one of the user devices 104, 106, 204, and/or the server 102 of the authentication systems 100, 200, 220, and/or 240 may include an identification module that may execute on a processor 134/144 of the associated user device 104, 106, or 204 or the processor 112 of the server 102. The identification modules can identify the user based on user's selection on the display screen of the user device 104, 106, or 204.

Additionally, the authentication system 100 may create one or more user accounts for a user. Each user account with the authentication system 100 can include the information associated with the one or more routes travelled by a user and the information including images corresponding to the objects viewed by the user along the routes. In an example, the accounts can exclusively be used by the authentication system 100 and the user may not be aware of the accounts.

In some embodiments, an account, possibly referred to a user account, may take a number of different forms. For example, an account may include a compilation of data associated with a given user. For example, an account for a particular user may include data related to the user and/or the user's interests, such as the routes travelled by the user to work home, shopping, or vacation. The user accounts can be stored in the data storage 116 or memory 114 of the server 102. As an example, one or more accounts can be sent, e.g., via network 108, to a user device 104 or 106 of the user.

In some embodiments, a user account may be created for one or more users. For example, an account may be used for a user and his/her spouse because both of them travel a number or routes together. In some instances, the account may be a corporate account, where employees, staff, worker personnel, and/or contractors, among other individuals may travel the same work-related route. Yet further, it should be noted that a user, as described herein, may be a number of individuals or possibly a robot, a robotic system, a computing device, a computing system, and/or another form of technology.

Figure 6:
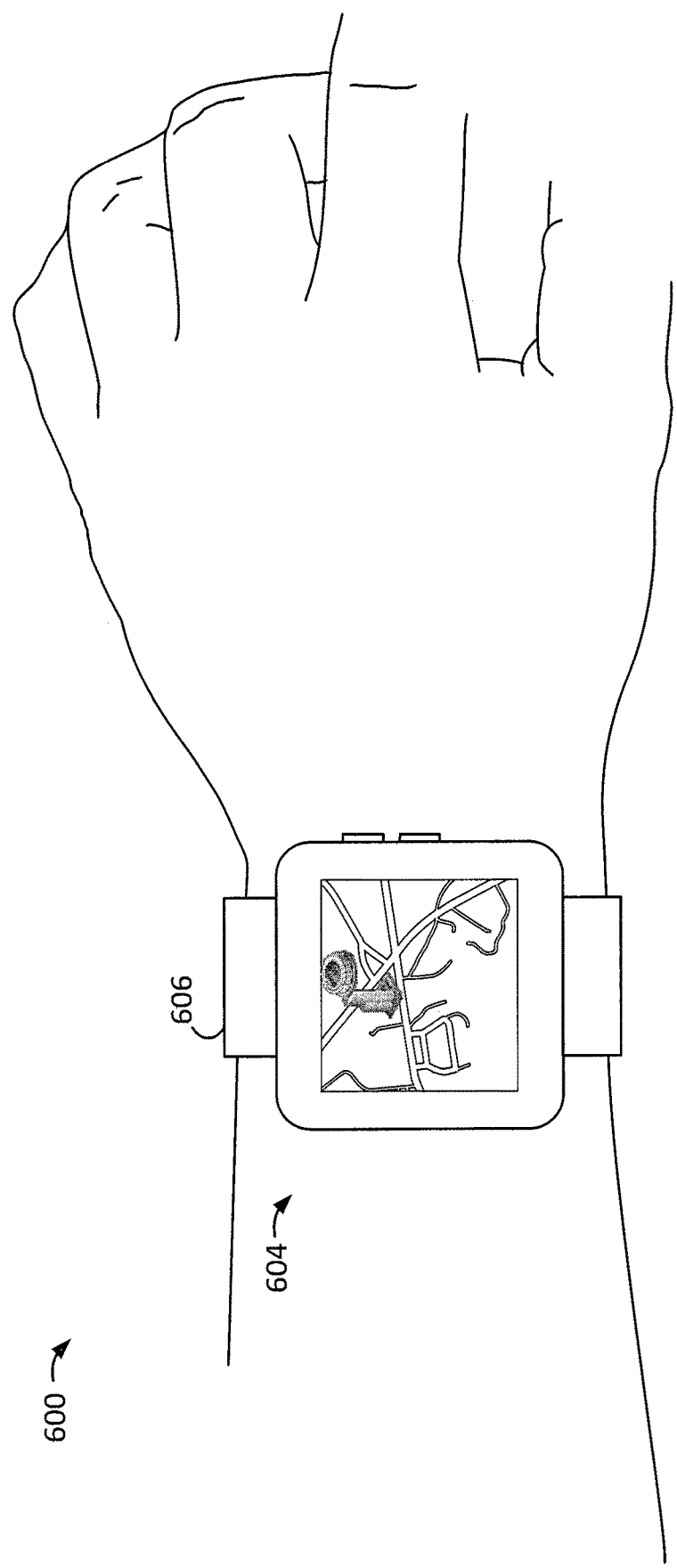
FIG. 6 illustrates exemplary user devices, according to an embodiment.

FIG. 6 illustrates an exemplary wearable computing device coupled to a user device, according to an embodiment. As illustrated by diagram 600, the wearable computing device 604 may take the form of a smart watch. Further, the device 604 may include a graphical user interface (GUI). As shown, the GUI may provide the map of the user's route as described above. The smart watch may be coupled to the user device 204 and may communicate with the user device to receive the map information and the location of the user.

Further, the wearable computing device 604 may have one or more sensors including accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs directly and/or indirectly from the user. The sensors, possibly located on the inside surfaces of the wrist band 606, may be configured to receive a number of inputs associated with the user.

Figure 7:
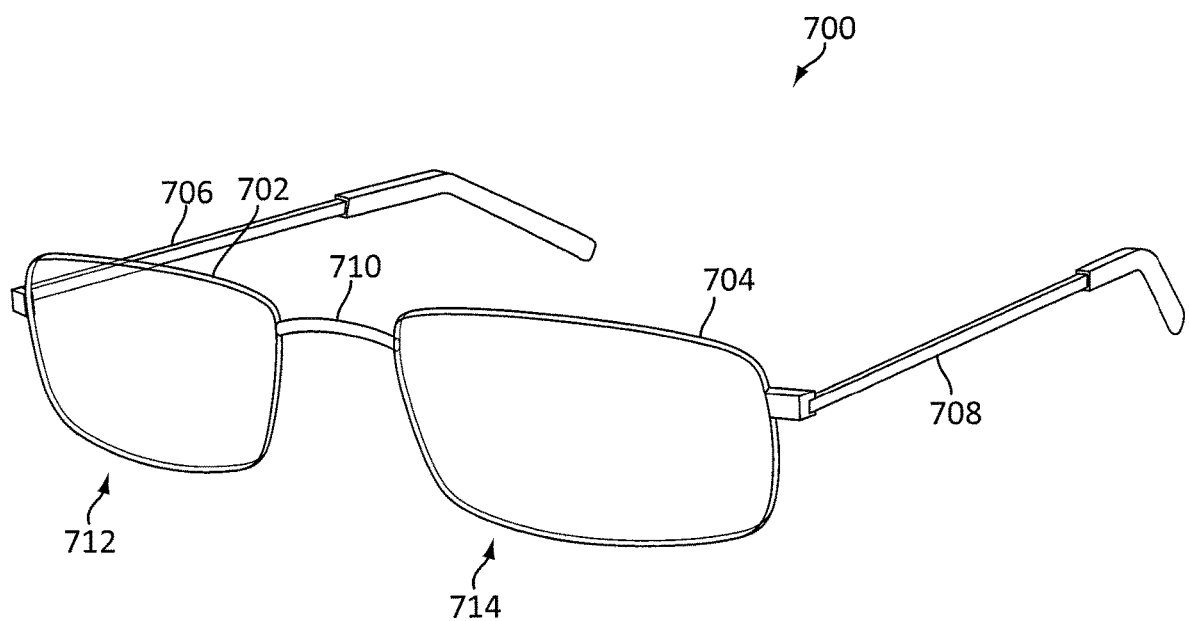
FIG. 7 illustrates exemplary user devices, according to an embodiment.

FIG. 7 provides an exemplary user device 700, according to some embodiments. The user device 700 may take the form of the user device 500 and/or other user devices described above in relation to FIGS. 1, 2A, 2B, 2C, and 3. As shown, the user device 700 may take the form of a wearable computer. The user device 700 may include a wearable computing device with at least one of a head-mountable display (HMD).

In some embodiments, the user device (e.g., the head-mountable device) 700 may include a camera and may be used to capture images and the user view of various objects described above may be determined by the images captured by the camera of the user device 700. In another example, the head-mountable device 700 may detect the view direction of the user wearing the head-mountable device 700 and can send the viewing angle of the user to the authentication system 200, 220, and/or 240. For example, the user view may be determined through the lenses 702 and 704. In particular, the user view may be determined based on the user's field of view through the lenses 702 and 704. The user device 700 may also include a side component 706, a side component 708, and a middle component 710. For example, the computing device 700 may be mountable on a user's head such that the side component 706 rests on one ear of the user and the side component 708 rests on the other ear of the user. Further, the middle component 710 may rest on the nose of the user. In some instances, the lenses 702 and 704 may be positioned in front of the user's eyes. Further, the lenses 702 and 704 may include displays 712 and 714, respectively.

In some embodiments, the head-mountable device 700 may be coupled directly or through another user device to the authentication systems 100, 200, 220, and/or 240. The device 700 may receive a command from an authentication system 100, 200, 220, or 240 to capture an image. Additionally, the head-mountable device 700 can receive an indication (e.g., a touch and or a gesture) by the user to capture an image.

In some instances, the displays 712 and 714 may be transparent, partially see-through, and/or configured to provide an augmented reality, for example show a map image such as the map 202 described above. Further, the displays 712 and/or 714 may include touch sensing displays. As an example, an image of the augmented reality viewed by the user through the displays 712 and/or 714 of the head-mountable device 700 can be used as the image viewed by the user.

Figure 8A:
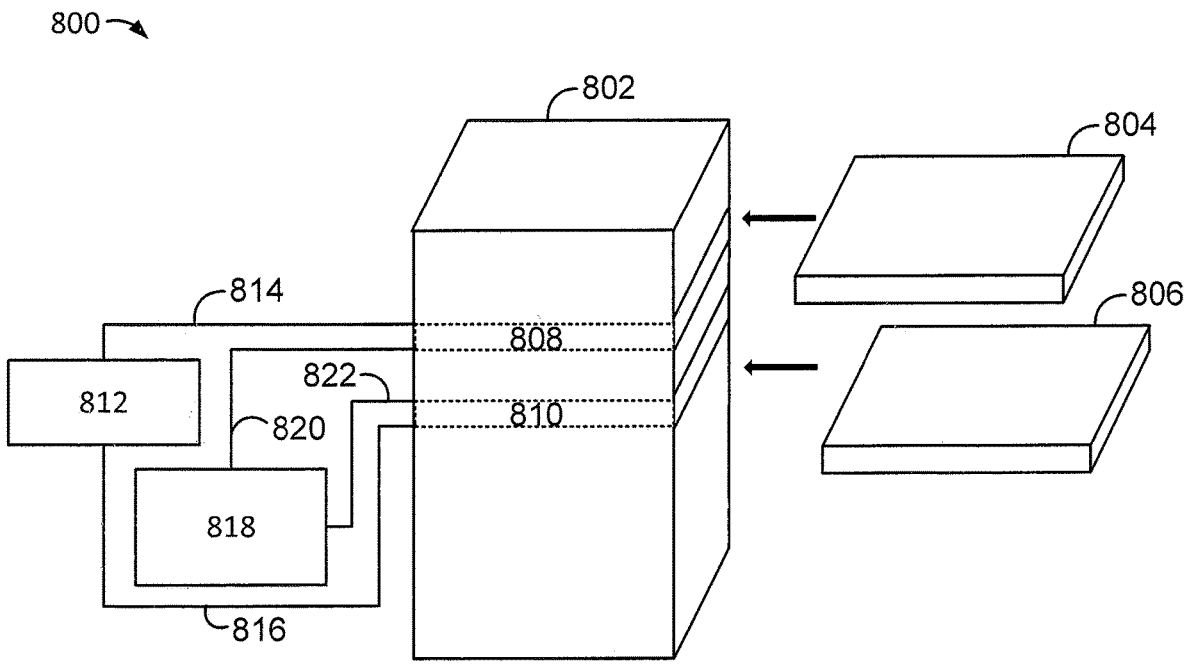
FIG. 8A illustrates an exemplary system configured to support a set of trays, according to an embodiment.

FIG. 8A illustrates an exemplary system 800 configured to support a set of trays 804 and 806, according to an embodiment. The system 800 may, for example, include or take the form of the server 102 described above in relation to FIG. 1. In particular, the system 800 may also be referred to as the server 800 and/or the server system 800. As such, the system 800 may manage numerous authentication requests for the users of user devices, such as the user devices 104 and/or 106. The system 800 may further support, operate, run, and/or manage the authentication requests, possibly in addition to various applications, websites, and/or services.

As shown, the system 800 may include a chassis 802 that may support trays 804 and 806, possibly also referred to as servers and/or server trays 804 and/or 806. Notably, the chassis 802 may support multiple other servers and/or trays as well. The chassis 802 may include slots 808 and 810, among other possible slots, configured to hold or support trays 804 and 806, respectively. For example, the tray 804 may be inserted into the slot 808 and the tray 806 may be inserted into the slot 810. Yet, the slots 808 and 810 may be configured to hold the trays 804 and 806 interchangeably such that the slot 808 may be configured to hold the tray 806 and the slot 810 may be configured to hold the tray 804.

Further, the chassis 802 may be connected to a power supply 812 via connections 814 and 816 to provide power to the slots 808 and 810, respectively. The chassis 802 may also be connected to the communication network 818 via connections 820 and 822 to provide network connectivity to the slots 808 and 810, respectively. As such, trays 804 and 806 may be inserted into slots 808 and 810, respectively, and power supply 812 may supply power to trays 804 and 806 via connections 814 and 816, respectively. Further, trays 804 and 806 may be inserted into the slots 810 and 808, respectively, and power supply 812 may supply power to trays 804 and 806 via connections 816 and 814, respectively.

Yet further, trays 804 and 806 may be inserted into slots 808 and 810, respectively, and communication network 818 may provide network connectivity to trays 804 and 806 via connections 820 and 822, respectively. In addition, trays 804 and 806 may be inserted into slots 810 and 808, respectively, and communication network 818 may provide network connectivity to trays 804 and 806 via connections 822 and 820, respectively. The communication network 818 may, for example, take the form of the one or more communication networks 108 of FIG. 1, possibly including one or more of a data network and a cellular network. In some embodiments, the communication network 818 may provide a network port, a hub, a switch, or a router that may be connected to an Ethernet link, an optical communication link, a telephone link, among other possibilities.

In practice, the tray 804 may be inserted into the slot 808 and the tray 806 may be inserted into the slot 810. During operation, the trays 804 and 806 may be removed from the slots 808 and 810, respectively. Further, the tray 804 may be inserted into the slot 810 and the tray 806 may be inserted into the slot 808, and the system 800 may continue operating, possibly based on various data buffering mechanisms of the system 800. Thus, the capabilities of the trays 804 and 806 may facilitate uptime and the availability of the system 800 beyond that of traditional or conventional servers that may be required to run without interruptions. As such, the server trays 804 and/or 806 facilitate fault-tolerant capabilities of the server system 800 to further extend times of operation. In some instances, the server trays 804 and/or 806 may include specialized hardware, such as hot-swappable hard drives, that may be replaced in the server trays 804 and/or 806 during operation. As such, the server trays 804 and/or 806 may prevent interruptions to further increase uptime.

Figure 8B:
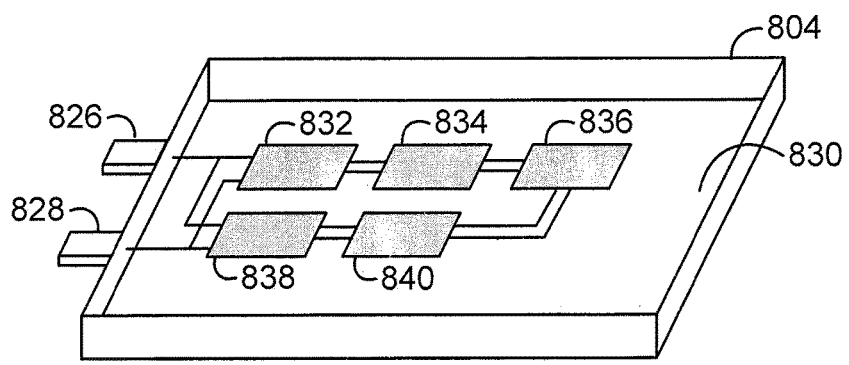
FIG. 8B illustrates an exemplary tray configured to support one or more server components, according to an embodiment.

FIG. 8B illustrates an exemplary tray 804 configured to support one or more components, according to an embodiment. The tray 804, possibly also referred to as the server tray 804, may take the form of the tray 804 described in relation to FIG. 8A. Further, the tray 806 may also take the form of the tray 804. As shown, the tray 804 may include a tray base 830 that may include the bottom surface of the tray 804. The tray base 830 may be configured to support multiple components such as the hard drives described above and a main computing board connecting one or more components 832-840. The tray 804 may include a connection 826 that may link to the connections 814 or 816 to supply power to the tray 804. The tray 804 may also include a connection 828 that may link to the connections 820 or 822 to provide network connectivity to the tray 804. The connections 826 and 828 may be positioned on the tray 804 such that upon inserting the tray 804 into the slot 808, the connections 826 and 828 couple directly with the connections 814 and 820, respectively. Further, upon inserting the tray 804 into the slot 810, the connections 826 and 828 may couple directly with connections 816 and 822, respectively.

In some embodiments, the tray 804 may include a hardware processor component 832, a non-transitory memory component 834, a non-transitory data storage component 836, a communication interface component 838, that may, for example, respectively take the form of the processor 112, the memory 114, the data storage 116, and the communication interface 118, shown in FIG. 1. Further, the tray 804 may include the data engine component 840 that may manage user data (UD) for numerous users. As such, the connections 826 and 828 may be configured to provide power and network connectivity, respectively, to each of the components 832-840. In some embodiments, one or more of the components 832-840 may perform operations described herein, illustrated by the accompanying figures, and/or otherwise contemplated As shown, the hardware processor component 832 may take the form of a multi-purpose processor, a microprocessor, a special purpose processor, a digital signal processor (DSP). Yet further, the processor component 832 may take the form of an application specific integrated circuit (ASIC), a programmable system on chip (PSOC), field-programmable gate array (FPGA), and/or other types of processing components. In particular, the processor component 832 may create, modify, and/or build UDs for numerous users. For example, the processor component 832 may be configured with a Unix-based operating system. Further, the processor component 832 may support the scalability of UDs generated with various other servers, such as those described above in relation to the authentication system 150 of FIG. 11. In particular, the processor component 832 may be configured to facilitate the scalability with multiple such servers of various forms that may, for example, include server trays, blades, and/or cartridges similar to the server trays 804 and/or 806. In some instances, the processor component 832 may be configured with scalable process architectures, including, reduced instruction set architectures. In some instances, the processor component 832 may be backwards compatible with various legacy systems to generate UDs such that the processor component 832 may receive, read, and/or execute instruction sets with legacy data formats and/or structures. As such, the processor component 832 generally has capabilities beyond that of general-purpose processors.

The database engine component 840 may include one or more secure databases to generate, build, and/or manage UDs for numerous users. In particular, the data base engine component 840 may organize and/or format the UDs for optimizing searches and/or retrieving data. In various circumstances, the database engine component 840 may perform searches based on numerous queries, search multiple databases in parallel, and produce search results simultaneously and/or consecutively. Thus, the database engine component 840 may relieve various bottlenecks encountered with conventional servers managing numerous data entries.

Any two or more of the components 832-840 described above may be combined. For example, two or more of the hardware processor component 832, the non-transitory memory component 834, the non-transitory data storage component 836, the communication component and/or interface 838, and/or the data engine component 840 may be combined. Further, the combined component may take the form of one or more processors, DSPs, SOCs, FPGAs, and/or ASICs, among other types of processing devices and/or components described herein. For example, the combined component may take the form an SOC that integrates various other components in a single chip with digital, analog, and/or mixed-signal functions, all incorporated within the same substrate. As such, the SOC may be configured to carry out various operations of the components 832-840.

The components 832-840 described above may provide advantages over conventional or general-purpose components. For example, the components 832-840 may enable the system 800 to transfer data over the one or more networks 818 to numerous other user devices, such as the user devices 104 and/or 106 of FIG. 1. In particular, the components 832-840 may enable the system 800 to create, build, and/or modify UDs for numerous users locally from a single server tray 804. In some instances, configuring a separate and/or dedicated hardware processor component 832 to generate, build, and/or manage UDs may optimize operations beyond the capabilities of conventional servers and/or general-purpose processors. As such, the average wait time for the user device (e.g., user device 104) to display image/data from the UDs may be minimized accordingly.

It can be appreciated that the system 800, the chassis 802, the trays 804 and 806, the slots 808 and 810, the power supply 812, the communication network 818, and the components 832-840 may be deployed in other ways. The operations performed by components 832-840 may be combined or separated for a given embodiment and may be performed by a greater number or fewer number of components or devices. Further, one or more components or devices may be operated and/or maintained by the same or different entities.

Further, the UDs may also include aspects of the location data of the route corresponding with the users, possibly retrieved from a user device of the user. For example, referring back to FIG. 1, various forms of location data of the routes may be retrieved based on the connection established with a user device (e.g., the user device 104) and a server (e.g., server 102). As such, based on data exchanges for establishing the connection, the server 102 may retrieve and control Wi-Fi beaconing data, Enhanced Observed Time Difference (EOTD) data, global positioning System (GPS)

data, Assisted GPS (A-GPS) data, Differential GPS (DGPS) data, Time Difference of Arrival (TDOA) data, Angle of Arrival (AOA) data, triangulation data, among other forms of location data of the user device 104 as described herein.

In some embodiments, the server of the authentication system includes a non-transitory memory including instructions and one or more hardware processors. In some examples, referring back to FIG. 1, the server 102 of the authentication system 100 can include the non-transitory memory 114 that stores the instructions and the one or more hardware processors 112. For instances, the one or more hardware processors 112 can be coupled to the non-transitory memory 114 to read the instructions.

In some instances, the authentication system 100, 200, 220, 240 can perform a number of operations. The operations include determining the route associated with the user based on data retrieved from a user device of the user, e.g., user devices 104, 106, or 204. For example, the route can be one of the routes 210, 230, or 250 travelled by the user in FIG. 2A, 2B, or 2C. Further, the operations include determining one or more objects associated with the route. For example, the objects can be one of the landmarks or billboards viewed by the user along the route 210, 230, or 250. Yet further, the operations include selecting at least one image of the one or more objects that corresponds to a user view of the one or more objects from the route. For example, the image can be one of the images of the landmarks or billboard viewed by the user along the route 210, 230, or 250. In addition, the operations include determining a request to authenticate the user based at least on the route associated with the user. For example, referring back to FIG. 5, a request of the user can be received by the display screen (e.g., user interface) 504. Also, the operations include authenticating the user based at least on a user selection of the image from a plurality of images provided to the user. For example, the user is authenticated base on one of the images 512, 514, 516, 518, 520, and 522 selected by the user in response to the query question on the display screen 504 of the user device 500.

As noted, the machine-readable instructions may be executable to cause the machine, such as the user device 500 of FIG. 5, to perform further operations. The operations may include determining a route associated with a user based on data retrieved from the user device 104, 106, or 204 of the user. For example, referring back to FIG. 2A, 2B, or 2C, the route can be one of the routes 210, 230, or 250 travelled by the user. Further, the operations include determining one or more objects associated with the route. For example, the objects can be one of the landmarks or billboard viewed by the user along the route 210, 230, or 250. Yet further, the operations include generating one or more images of the one or more objects on one or more user views of the one or more objects from the route. For example, the image can be one of the images of the landmarks or billboard viewed by the user along the route 210, 230, or 250. Additionally, the operations include determining a request to authenticate the user based on the one or more user views of the one or more objects from the route. For example, referring back to FIG. 5 a request of the user can be received by the display screen 504. Also, the operations include authenticating the user based at least on one or more user selections corresponding to the one or more images from a plurality of images viewed by the user. For example, the user is authenticated base on one or more of the images 512, 514, 516, 518, 520, and 522 selected by the user in response to the question on the display screen 504 of the user device 500.

In some embodiments, determining the route can include accessing a database through a database engine (e.g., database engine 840) where the information about the user account can be stored in the database. As an example, the information about the user includes the information about the route.

Figure 9:
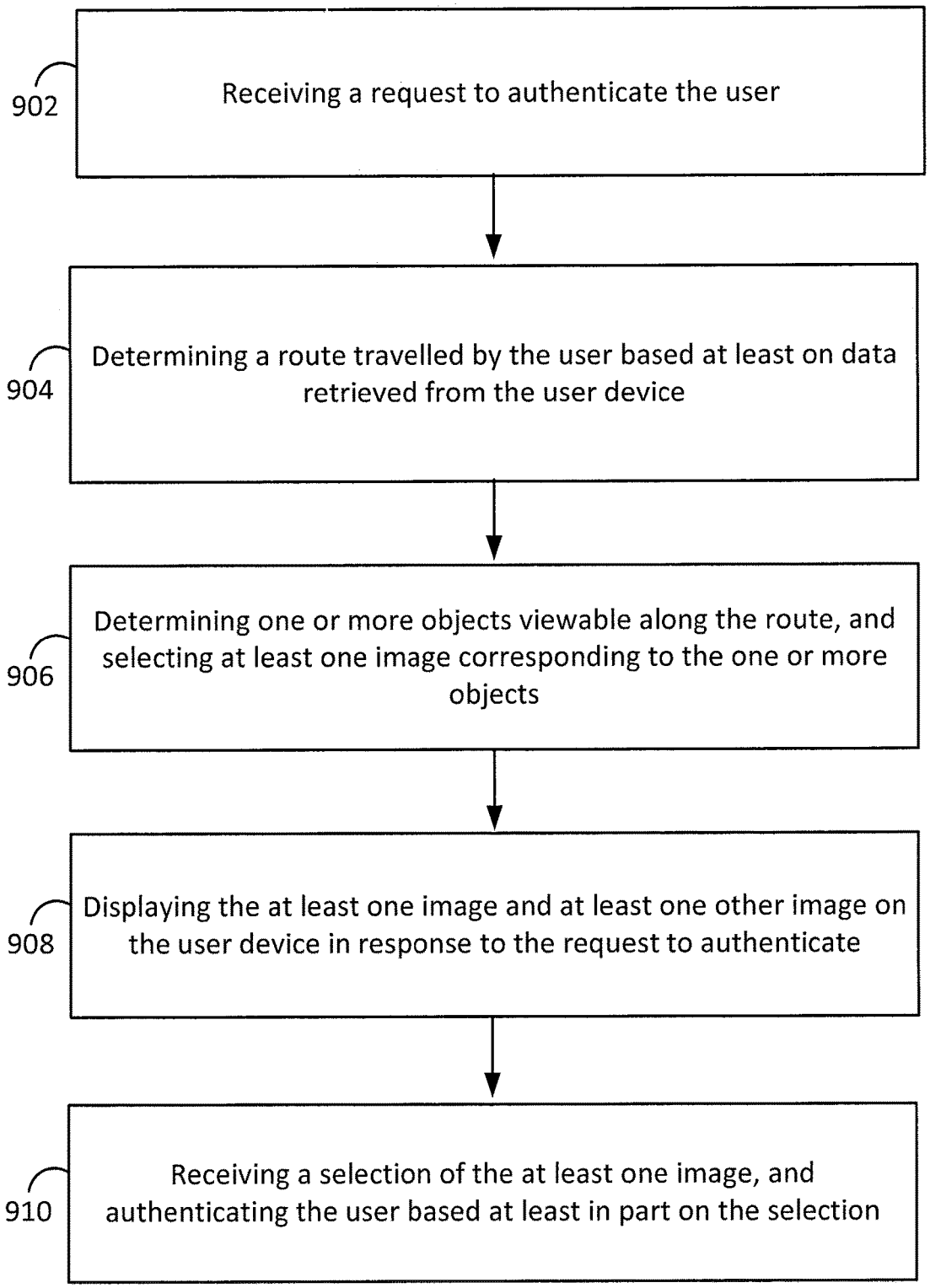
FIG. 9 illustrates an exemplary method, according to an embodiment.

FIG. 9 illustrates an exemplary method 900, respectively, according to an embodiment. Notably, one or more steps of the method 900 described herein may be omitted, performed in a different sequence, and/or combined with other methods for various types of applications contemplated herein. The method 900 can be performed by the user devices 104, 106, 204, 300, and 500 shown in FIGS. 1, 2A, 2B, 2C, 3, and 5.

As shown in FIG. 9, at step 902, the method 900 may include receiving a request to authenticate the user. For example, referring back to FIG. 5, a request to authenticate the user can be received by the display screen 504. As another example, a request for authentication can be received by the user device when the user selects an item/icon on the display screen or more particularly if the user touches the display screen of the user device. In some embodiments, the display screen 504 of the user device 500 can show a login request 506 asking the user to select one or more of the images on the display screen. For example and with respect to FIG. 5, the message can ask the user to select one or more of the images 512, 514, 516, 518, 520, or 522 on the display screen 504.

At step 904, the method 900 may include determining a route travelled by the user based at least on data retrieved from the user device. For example, referring back to FIGS. 2A, 2B, and 2C, the routes 210, 230, and 250 can be determined based on data retrieved from the user device 204. As noted, the mapping module of the user device 204 can use GPS signals to determine the location of the user along the routes 210, 230, and 250. In an example, the route can be determined by the user device 204 of the user. In another example, the server, e.g., the server 102 of the authentication system 100, can retrieve the data from the user device, e.g., the user device 104 or 106, and can determine the route based on the data from the user device.

At step 906, the method 900 may include determining one or more objects viewable along the route, and selecting at least one image corresponding to the one or more objects. For example, referring back to FIG. 2A, the object can be a landmark such as the baseball stadium 212 viewable by the user inside the vehicle 206. Additionally, an image of the object 212, e.g., an image of the baseball stadium can be selected. The selected image, can corresponding to a user view of the objects from the route. In some embodiments, the user device (e.g., user device 500) can select one or more images of the objects. The objects can be landmarks or billboards viewed or capable of being viewed by the user along the route. With respect to FIG. 2A, the object can be a landmark such as the baseball stadium 212 viewable by the user travelling the route 210 inside vehicle 206. The object may be permanent or semi-permanent or may be only along the route for the day or a time of the day the user is along the route. With respect to FIG. 2B, the object can be a landmark such as the tree 232 viewable by the user biking the route 230. With respect to FIG. 2C, the object can be a landmark such as the town hall 252 viewable by the user 246 walking the route 250. Alternatively, the objects viewed by the user along a route can be one or more billboards shown in FIGS. 4A and 4B and the viewed images can be the image of or content displayed on the billboards. Additionally, the objects can be one or more billboards and one or more landmarks and the viewed images can be a combination of images of the billboards and landmarks. Thus, the user devices can determine one or more objects, which can be sequential.

At step 908, the method 900 may include displaying the at least one image and at least one other image on the user device in response to the request to authenticate. For example and with respect to FIG. 5, the images 512, 514, 516, 518, 520, and 522 can be displayed on the display screen 504 of the user device 500 in response to the authentication request. As shown with respect to FIGS. 4A and 4B, the images 512 and 514 can be images of the objects, e.g., billboards 402 and 404, that may have been viewed by the user along the route. The plurality of other images 516, 518, 520, and 522 can be retrieved by the user device through a network, e.g., the network 108 of the authentication system 100. Additionally, a login request 506 may be shown on the user screen 504 of the user device 500, asking the user to select one or more of the images on the display screen. In an example, the login request 506 can ask the user to select an image viewed along the route. In another example, the login request 506 may ask the user to select a sequence of images, in order, viewed along the route.

At step 910, the method 900 may include receiving a selection of the at least one image, and authenticating the user based, at least in part, on the selection. The selection can be received through a display screen, e.g., the display screen 504 of the user device 500. The display screen 504 of the user device 500 can show a login request 506 asking the user to select one or more of the images on the display screen. For example, the message can ask the user to select one or more of the images 512, 514, 516, 518, 520, or 522 as the images viewed by the user along the route. The user may select one or more of the images 512, 514, 516, 518, 520, or 522 and the user device may receive the user selections. As an example, after the user correctly selects the image 512 on the display screen 504 as the image of the object, e.g., the billboard 402, viewed en-route, the authentication system may identify the user and may grant user's request. For example, after user authentication, the authentication system may grant the user to access a user's account. Alternatively, after authentication, the user device may grant the user access to the user device. The type of authentication described herein may be a first factor authentication, such that no other authentication is needed to grant access, or the authentication may be a second or subsequent authentication, such that it is used in combination with one or more other authentication methods, such as a biometric login, entry of a password or PIN, or the like. Use of authentications as described herein may depend on the level of security desired for authentication, such as access to more confidential data, a request for a higher value purchase, etc. and may require additional authentication (such as a biometric or password/PIN), while lower security access may only require the object-based authentication described herein.

Figure 10:
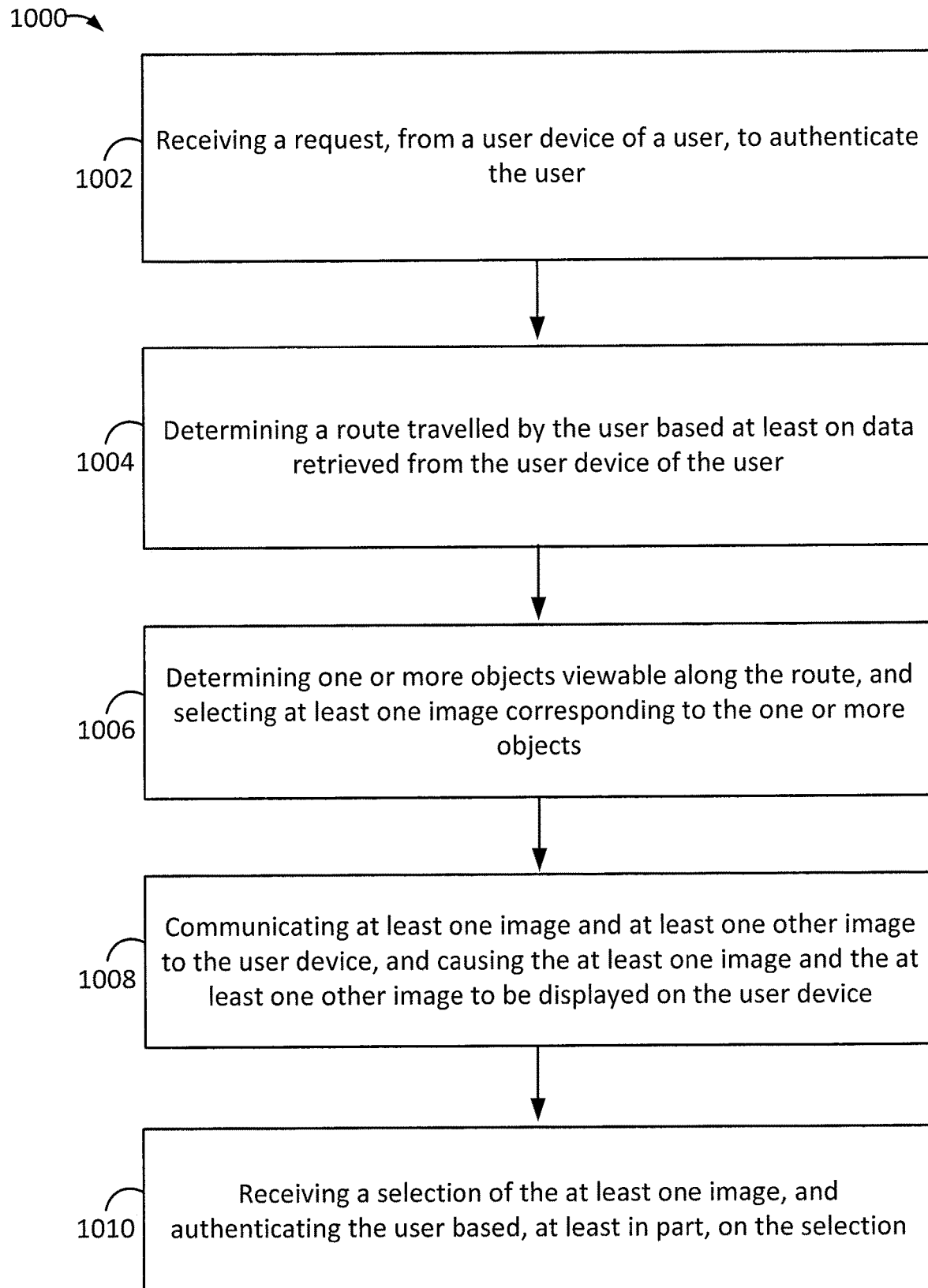
FIG. 10 illustrates an exemplary method, according to an embodiment.

FIG. 10 illustrates an exemplary method 1000, respectively, according to an embodiment. Notably, one or more steps of the method 1000 described herein may be omitted, performed in a different sequence, and/or combined with other methods for various types of applications contemplated herein. The method 1000 can be performed by the authentication system of FIGS. 1, 2A, 2B, and 2C. In some embodiments, the operations performed by the authentication systems 100, 150, 200, 220, or 240, can be performed by one or more modules executing by one or more processors, e.g., the processors 112 of the server 102 of the authentication system 100. Additionally, a portion or all of the operations can be executed by one or more processors of the user devices, e.g., by the processors 134 or 144 of the user devices 104 or 106.

As shown in FIG. 10, at step 1002, the method 1000 may include receiving a request, from a user device of a user, to authenticate the user. The authentication systems 100, 150, 200, 220, or 240, can receive a request to authenticate the user from the user device of the user. The user device can take the form of the user devices 104, 106, 204, 300, and 500. For example, the display screen 504 of an example user device 500 shows receiving a request for user authentication. In an example, the request from the user device can be sent, e.g., through the network 108 to sever 102 of the authentication system 100.

At step 1004, the method 1000 may include determining a route travelled by the user, based at least on data retrieved from the user device of the user. The route travelled by the user can be determined in response to receiving the request from a user device of a user. For example, referring back to FIGS. 2A, 2B, and 2C, the routes 210, 230, and 250 can be determined based on data retrieved from the user device 204. As noted, the mapping module of the user device 204 can use GPS signals to determine the location of the vehicle 206 along the routes 210, 230, and 250. In an example, a server, e.g., the server 102 of the authentication system 100, can retrieve the data from a user device, e.g., the user device 204, and can determine the route. In another example, the route can be determined by the user device of the user.

At step 1006, the method 1000 may include determining one or more objects viewable along the route and selecting at least one image corresponding to the one or more objects. For example, the object viewable along the route 210 can be a landmark such as the baseball stadium 212 viewable by the user inside vehicle 206. Additionally, an image of the object 212, e.g., an image of the baseball stadium can be selected to be used for authentication. In another example, the image of the object 212, e.g., the image of the baseball stadium 212 can be determined according to the user view of the baseball stadium 212 and for instance from the angle the user was viewing the baseball stadium 212 at location 216 of the route 210. In an example, a server, e.g., the server 102 of the authentication system 100 can determine the objects viewable along the route as well as can select the at least one image of the objects. In another example, the objects viewable along the route as well as the selection of the at least one image of the objects can be determined by the user device of the user.

At step 1008, the method 1000 may include communicating the at least one image and at least one other image to the user device causing the at least one image and the at least one other image to be displayed on the user device. Communicating the at least one image and at least one other image to the user device and/or the display of the images on the display screen of the user device can be in response to the request to authenticate. A server, e.g., the server 102 of the authentication system 100 can communicate and can send the images of the viewed objects as well as the other images through the network 108 to a user device that can take the form of the user devices 104, 106, 204, 300, and 500. In response to the authentication request, for example, the display screen 504 of the user device 500 can display the images 512 and 514 of the billboards 402 and 404 viewed by the user en-route. Additionally, the display screen 504 of the user device 500 can display the other images 516, 518, 520, and 522.

At step 1010, the method 1000 may include receiving, a selection of the at least one image, and authenticating the user based, at least in part, on the selection. The authentication system, e.g., the authentication system 100, 200, 220, or 240 can receive the selection of the user through a display screen of the user device e.g., user device 104, 106, 204, 300, or 500. The display screen 504 of the user device 500 can show a login request 506 asking the user to select one or more of the images on the display screen. For example, the message can ask the user to select one or more of the images 512, 514, 516, 518, 520, or 522 as the image viewed by the user along the route. As an example, after the user correctly selects one of the images on the display screen 504, the authentication system may identify the user and may grant user's request. For example, after user authentication, the authentication system may grant the user to access a user's account. For example, the user may select the image 512 as an image viewed en-route to work today and the authentication system (e.g., authentication system 200) may grant user's request.

Figure 11:
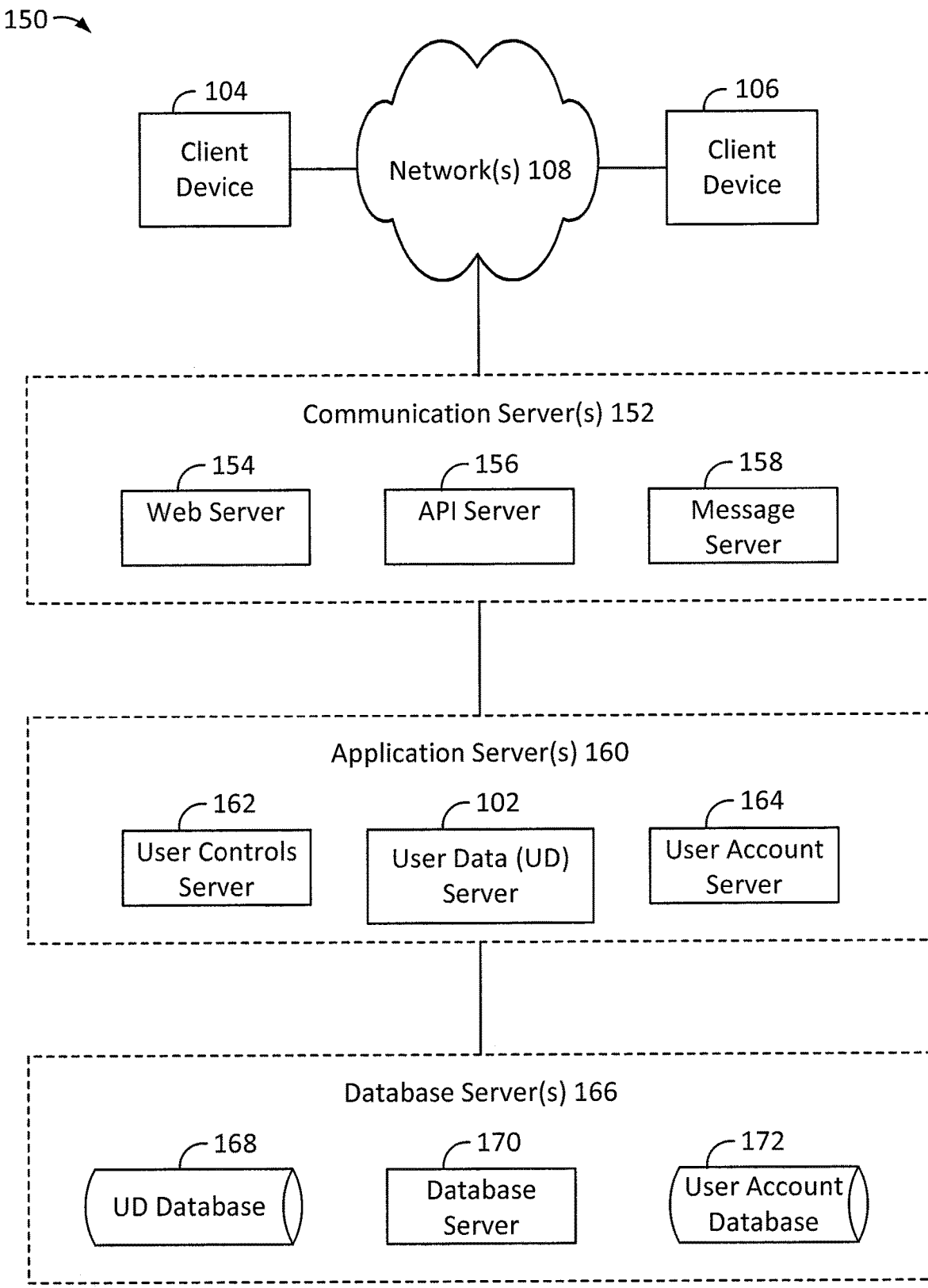
FIG. 11 is a block diagram of an exemplary authentication system, according to an embodiment.

FIG. 11 is a block diagram of another exemplary authentication system, according to an embodiment. As shown, the system 150, possibly referred to as the data infrastructure 150, may be configured to transfer the data packets 122 and/or 124 as described above in relation to authentication system 100 in FIG. 1. For example, the system 150 includes the server 102 of the authentication system 100, shown as a user data (UD) server 102 and can store the UD including the information of the routes and objects associated with the routes in the server 102. Further, the system 150 includes the user devices 104 and 106, and also the one or more networks 108 of the authentication system 100. As illustrated, the data infrastructure 150 may include one or more communication servers 152, one or more application servers 160, and/or one or more database servers 166.

In some embodiments, the one or more communication servers 152 may include a web server 154, an application programming interface (API) server 156, and/or a message server 158. The web server 154 may be configured to communicate with the user devices 104 and/or 106 over the one or more networks 108. The web server 154 may host numerous web browsers, web sites, web-based applications, software applications, virtual machines, and/or other possibilities. The API server 156 may be configured to communicate with various applications or mobile apps of the user devices 104 and/or 106, including service provider applications configured to communicate with API-based communications and/or protocols over the one or more networks 108. The message server 158 may be configured to communicate with the user devices 104 and/or 106 over the one or more networks 108 with various transmissions, communication mediums, and/or related applications such as e-mail, local area network (LAN) messaging, and/or short message service (SMS), among various other possibilities. Notably, any two or more of the servers 154, 156, and/or 158 may be combined and the combined server may be configured to perform one or more operations of the servers 154, 156, and/or 158 as described and/or contemplated herein.

In some embodiments, the one or more application servers 160 may include the user data (UD) server 102, the user controls server 162, and/or the user account server 164. The UD server 102 may maintain, manage, and/or support numerous UDs, each UD including the data about the routes travelled by a user and the objects as well as the images of the object corresponding with the routes travelled by the user. The user controls server 162 may maintain, manage, and/or support various user controls, configurations, and/or settings associated with the respective UDs for the one or more users. Additionally, the user account server 164 may maintain, manage, and/or support numerous user accounts for the one or more users. In addition to the routes, objects corresponding to the routes and images of the objects, the accounts can optionally include personal information such as address and email of the users.

In some embodiments, the one or more database servers 166 may include the database server 170, the user data database 168, and/or the user account database 172. The database server 170 may communicate with the UD server 102 to facilitate the storage of data, data types, and/or data entries in the UD database 168. The database server 170 may also communicate with the user account server 164 to facilitate the storage of user account data in the user account database 172. In some embodiments, the data stored with the UD database 168 may correspond to the data stored with the user account database 172. As such, the database server 170 may include one or more search indexes with varying complexities to minimize replicated data entries stored in the UD database 168 and the user account database 172.

In practice, for example, the user data of a user operating the user device 104 may send via one or more networks 108 to the UD server to create UD account for the user. Referring back to FIG. 1, the request may be embedded with the data/data packet 122. As such, the request may be transmitted to the one or more communications servers 152 to request a connection with the UD server 102. For example, the web server 154, possibly referred to as a domain name server (DNS) in this scenario, may search and identify one or more internet protocol (IP) addresses of the UD server 102, possibly taking the form of 192.168.102.100. As such, a connection with the user device 104 and the UD server 102 may be established to create the UD account. Notably, the user device 104 may establish such connections with the UD server 102 with or without user inputs, possibly to generate, build, and/or modify the user data in real-time, possibly unbeknownst to the user of the user device 104.

In some embodiments, the system 150 may be referred to as a user data system (UD) 150. In particular, the UD system 150 may include the non-transitory memory 114 for storing instructions. The UD system 150 may also include the one or more of hardware processors 112 coupled to the non-transitory memory 114 and configured to read the instructions to cause the system 150 to perform operations. The UD system 150 may create one or more UDs for a user with or without the user's inputs, where each UD identifies routes associated with a user, objects associated with the routes and image of the routed viewed by the user. The system 150 may recognize various forms of data natively stored in the user device 104, possibly based on the connection protocols between the user device 104 and the UD server 102 described above.

It can be appreciated that the server 102 and the user devices 104 and/or 106 in FIGS. 1 and 11 may be deployed in various other ways. For example, the operations performed by the server 102 and/or the user devices 104 and 106 may be performed by a greater or a fewer number of devices. Further, the operations performed by two or more devices, such as the servers 102, 162, and/or 164, may be combined and performed by a single device, such as the server 102. Yet further, the operations performed by a single device, such as the server 102, may be separated or distributed among the server 102, the user controls server 162, the user account server 164, and/or the database server 170, among other possible devices. In addition, the user devices 104 and/or 106 may be operated and/or maintained by different users such that each user device 104 and/or 106 may be associated with at least one UD.

In some embodiments, referring to FIG. 11, the system 150 may activate an application, such as a mobile app on the user device 104 to authenticate the user. For example, the server 102 may establish a connection with the user device 104 over the one or more networks 108, possibly based on one or more calls exchanged with the API server 156. As such, the mobile app may be activated to display the display screen (GUI) 504 shown in FIG. 5. Further, the app may allow the user to access the user device 500 or access an account on the mobile app based on user's input on the user screen 504.

In some instances, the one or more hardware processors of the servers (e.g., processors 112 of FIG. 1 and/or processor 832 of FIG. 8B) may determine the location of the user device 102 or 104 by retrieving data from the user device 104 or 106. For example, the location may be determined by cellular protocol data, including GSM, CDMA, UMTS, EV-DO, WiMAX, or LTE data, and/or base station data, among other forms of data possibly available. In addition, the location may be further determined by sensor data, movement data (e.g., acceleration and/or velocity data) of the user device, temperature data, radio-frequency identifier (RFID) data, near-field communications (NFC) data, among other possible forms of data available.

The present disclosure, the accompanying figures, and the claims are not intended to limit the present disclosure to the example embodiments disclosed. As such, it is contemplated that various alternate embodiments and/or modifications to the embodiment disclosed, whether explicitly described or implied herein, are possible in light of the disclosure and/or the figures. Having thus described embodiments of the present disclosure, persons of ordinary skill in the art will recognize that changes may be made to the embodiments disclosed without departing from the scope of the present disclosure.

What is claimed is:

1. A system comprising:
   one or more computer-readable memories storing program instructions; and
   one or more processors configured to execute the program instructions to cause the system to perform operations comprising:
   in response to detecting a reception of an authentication credential from a user device, determining a travel path corresponding to a user of the user device;
   determining one or more images corresponding to the determined travel path;
   transmitting a plurality of images to the user device, wherein the plurality of images includes the determined one or more images;
   receiving, from the user device, information indicating a selection of the one or more images from the plurality of images; and
   in response to receiving the information indicating the selection of the one or more images, authenticating the user.

2. The system of claim 1, wherein the determined one or more images correspond to one or more objects that are viewable from the determined travel path.

3. The system of claim 1, wherein the authentication credential includes login information corresponding to the user.

4. The system of claim 1, wherein the determining the travel path corresponding to the user includes receiving current location information from the user device.

5. The system of claim 1, wherein the determining the travel path corresponding to the user includes receiving past location information from the user device.

6. The system of claim 1, wherein at least one image of the plurality of images does not correspond to the determined travel path.

7. The system of claim 1, wherein the determining the one or more images corresponding to the determined travel path includes:
   determining an object corresponding to the determined travel path;
   determining a first image from a plurality of images displayed by the object that corresponds to a time period when the object is viewable by the user; and
   wherein the determined one or more images includes the first image.

8. A method comprising:
   in response to detecting an authentication request corresponding to a user device, determining a travel path corresponding to a user of the user device;
   determining a first plurality of images corresponding to the determined travel path, wherein the first plurality of images correspond to one or more objects that are viewable from the determined travel path;
   determining a first image from the first plurality of images corresponding to the determined travel path;
   transmitting the first image and a second plurality of images to the user device, wherein the second plurality of images is different from the first plurality of images;
   receiving, from the user device, information indicating a selection of the first image; and
   in response to receiving the information indicating the selection of the first image, authenticating the user.

9. The method of claim 8, wherein the determining the first image from the first plurality of images is based on determining that a likelihood that the first image will be viewed by the user is higher than a likelihood that at least one of the first plurality of images will be viewed by the user.

10. The method of claim 8, wherein the transmitting the first image and the second plurality of images to the user device causes the first image and the second plurality of images to be displayed on a user interface of the user device.

11. The method of claim 8, wherein the detecting the authentication request corresponding to the user device includes receiving an authentication credential from the user device.

12. The method of claim 11, wherein the authentication credential includes login information corresponding to the user.

13. The method of claim 8, wherein the second plurality of images does not correspond to the determined travel path.

14. The method of claim 8, wherein the determining the travel path corresponding to the user includes receiving current location information from the user device.

15. A non-transitory computer readable medium storing program instructions, the program instructions when executed cause a machine to perform operations comprising:
   in response to detecting a reception of an authentication credential from a user device, determining a travel path corresponding to a user of the user device;
   determining one or more images corresponding to the determined travel path;
   transmitting a plurality of images to the user device, wherein the plurality of images includes the determined one or more images;

receiving, from the user device, information indicating a selection of the one or more images from the plurality of images; and in response to receiving the information indicating the selection of the one or more images, authenticating the user.

16. The non-transitory computer readable medium of claim 15, wherein the determined one or more images correspond to one or more objects that are viewable from the determined travel path.

17. The non-transitory computer readable medium of claim 15, wherein the authentication credential includes login information corresponding to the user.

18. The non-transitory computer readable medium of claim 15, wherein the determining the travel path corresponding to the user includes receiving current location information from the user device.

19. The non-transitory computer readable medium of claim 18, wherein the determining the travel path corresponding to the user further includes receiving past location information from the user device.

20. The non-transitory computer readable medium of claim 15, wherein at least one image of the plurality of images does not correspond to the determined travel path.

* * * * *